United States Patent
Zorgui et al.

(10) Patent No.: US 12,529,749 B2
(45) Date of Patent: Jan. 20, 2026

(54) UPLINK-ANGLE OF ARRIVAL OPERATIONS IN GREEN NETWORKS

(71) Applicant: QUALCOMM Incorporated, San Diego, CA (US)

(72) Inventors: Marwen Zorgui, San Diego, CA (US); Ahmed Attia Abotabl, San Diego, CA (US); Mohammed Ali Mohammed Hirzallah, San Diego, CA (US); Mahmoud Ashour, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 18/049,553

(22) Filed: Oct. 25, 2022

(65) Prior Publication Data
US 2024/0133991 A1  Apr. 25, 2024
US 2024/0230822 A9  Jul. 11, 2024

(51) Int. Cl.
*G01S 5/00* (2006.01)
*G01S 5/04* (2006.01)
(Continued)

(52) U.S. Cl.
CPC ............. *G01S 5/019* (2020.05); *G01S 5/04* (2013.01); *G01S 5/02213* (2020.05); *H04W 52/0206* (2013.01); *H04W 64/00* (2013.01)

(58) Field of Classification Search
CPC ........ G01S 5/019; G01S 5/02213; G01S 5/04; H04W 52/0206; H04W 64/00
(Continued)

(56) References Cited

U.S. PATENT DOCUMENTS 10,945,216 B2 *  3/2021  MolavianJazi ..... H04W 52/146
10,992,355 B2 *  4/2021  Lee ................... H04B 7/06956
(Continued)

FOREIGN PATENT DOCUMENTS

CN          112585882 A  *  3/2021  ........... H04B 7/0404
WO  WO-2021179248 A1  *  9/2021  ........... H04B 7/0404
(Continued)

OTHER PUBLICATIONS

International Search Report and Written Opinion—PCT/US2023/032661 —ISA/EPO—Dec. 21, 2023.
(Continued)

*Primary Examiner* — Chuong P Nguyen
(74) *Attorney, Agent, or Firm* — Procopio, Cory, Hargreaves & Savitch LLP/QUALCOMM Incorporated

(57) ABSTRACT

Aspects presented herein may improve the accuracy of uplink-based positioning when at least one network entity participating in the uplink-based positioning is operating under an energy saving mode. In one aspect, a network entity receives information indicative of a set of antenna panel configurations for a plurality of network nodes, where the set of antenna panel configurations is associated with a set of energy saving modes. The network entity transmits an indication of one or more UL-SRS transmission parameters for a UE based on the information indicative of the set of antenna panel configurations for the plurality of network nodes. In some examples, each antenna panel configuration in the set of antenna panel configurations may include a number of antennas to be used in an UL azimuth angle measurement and a number of antennas to be used in an UL elevation angle measurement under one energy saving mode.

30 Claims, 14 Drawing Sheets

(51) Int. Cl.
    *G01S 5/02*     (2010.01)
    *H04W 52/02*     (2009.01)
    *H04W 64/00*     (2009.01)

(58) Field of Classification Search
    USPC .................................................. 342/450, 451
    See application file for complete search history.

(56) References Cited

U.S. PATENT DOCUMENTS

| | | | | |
|---|---|---|---|---|
| 11,147,060 | B2* | 10/2021 | Nam | H04W 72/21 |
| 11,265,818 | B2* | 3/2022 | Cheng | H04W 72/21 |
| 11,523,459 | B2* | 12/2022 | Bao | H04W 64/00 |
| 11,728,856 | B2* | 8/2023 | Zhang | H04B 7/0691 |
| | | | | 375/262 |
| 11,943,715 | B2* | 3/2024 | Abdelghaffar | H04W 52/0206 |
| 12,317,218 | B2* | 5/2025 | Zorgui | H04W 64/00 |
| 2019/0190747 | A1* | 6/2019 | Park | H04B 7/0639 |
| 2020/0358494 | A1* | 11/2020 | Tang | H04B 7/0482 |
| 2022/0124457 | A1* | 4/2022 | Priyanto | H04W 4/029 |
| 2024/0049130 | A1* | 2/2024 | Lee | H04W 52/0216 |
| 2024/0098752 | A1* | 3/2024 | Chen | H04W 72/12 |
| 2024/0163702 | A1* | 5/2024 | Zorgui | H04W 4/38 |
| 2024/0380453 | A1* | 11/2024 | Zheng | H04W 76/38 |
| 2025/0048259 | A1* | 2/2025 | Liu | H04W 52/0258 |

FOREIGN PATENT DOCUMENTS

| | | |
|---|---|---|
| WO | 2022079269 A2 | 4/2022 |
| WO | 2023091246 A1 | 5/2023 |

OTHER PUBLICATIONS

Qualcomm Incorporated: "Various Corrections to NR Positioning", 3GPP TSG-RAN WG2 Meeting #109bis-e, R2-2003990, 33rd Generation Partnership Project, Mobile Competence Centre, 650, Route Des Lucioles, F-06921 Sophia-Antipolis Cedex, France, vol. RAN WG2, No. Online, Apr. 20, 2020-Apr. 30, 2020, May 1, 2020, 61 Pages, XP052354937, p. 34-p. 42, p. 50-p. 61.

* cited by examiner

UPLINK-ANGLE OF ARRIVAL OPERATIONS IN GREEN NETWORKS

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives information indicative of a set of antenna panel configurations for a plurality of network nodes, where the set of antenna panel configurations is associated with a set of energy saving modes. The apparatus transmits an indication of one or more uplink (UL)-sounding reference signal (SRS) (UL-SRS) transmission parameters for a user equipment (UE) in a UE positioning session based on the information indicative of the set of antenna panel configurations for the plurality of network nodes.

In an aspect of the disclosure, a method, a computer-readable medium, and an apparatus are provided. The apparatus transmits information indicative of a set of antenna panel configurations for the network node or for a plurality of network nodes including the network node, where the set of antenna panel configurations is associated with a set of energy saving modes. The apparatus receives an indication of one or more UL-SRS transmission parameters for a UE in a UE positioning session based on the information indicative of the set of antenna panel configurations for the plurality of network nodes.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
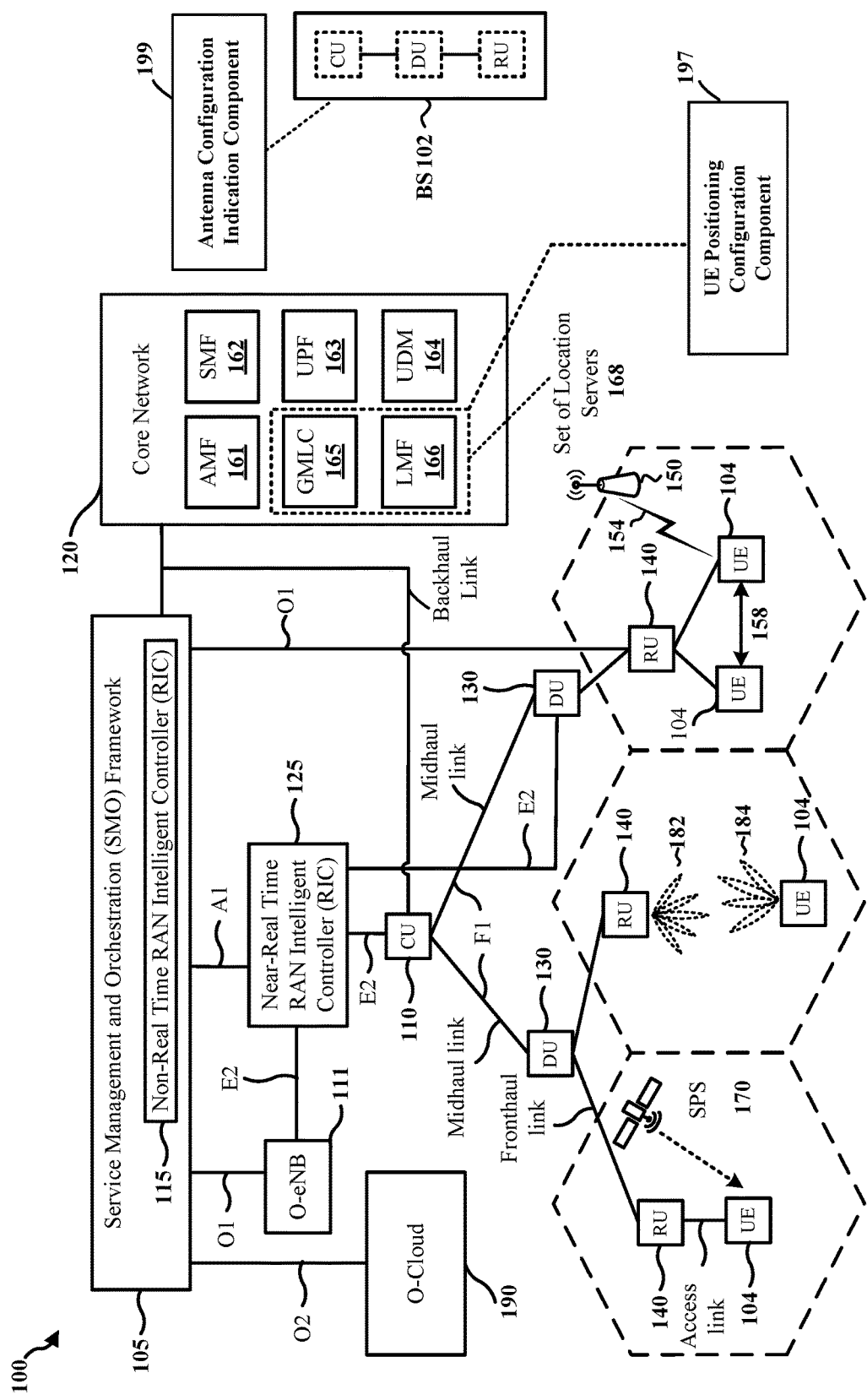
FIG. 1 is a diagram illustrating an example of a wireless communications system and an access network.

Some wireless communications systems (e.g., green networks) may support techniques to reduce network power consumption. These power savings may, in some examples, occur during periods with low traffic volume (e.g., low load scenarios with low data arrival rates and fewer connected UEs). In such examples, network entities may reduce overall power consumption by using lower transmission powers and/or fewer antennas. However, using reduced transmission powers and/or fewer antennas (e.g., entering a network power saving mode) may impact the accuracy of positioning procedures at other communication devices. For example, as UE positioning based on measuring UL-AoA relies on the number of antennas for accurate angle measurements, changing the number of receive antennas may impact the UL-AoA measurement accuracy. As such, the accuracy of uplink-based positioning procedures may be adversely impacted if the network entity changes its operating modes (e.g., to different power saving operations) or uses different transmission parameters (e.g., settings, configurations) for different energy saving (ES) modes. For example, a UE may be unable to receive PRS from a network entity or transmit SRS to the network entity if the network entity is operating with fewer antennas and/or a reduced transmission power. Thus, some uplink-based positioning procedures may not be suitable for wireless communications systems in which network entities frequently transition between different operating modes (e.g., different ES modes or energy saving operations).

Aspects presented herein may improve the accuracy of uplink-based positioning, such as UL-AoA positioning, when a network entity participating in the uplink-based positioning is operating under an energy saving mode (e.g., operating with a reduced number of antennas, with a reduced power in transmission/reception, and/or with a reduced processing capability, etc.). In other words, aspects presented herein may provide solutions to account for different network power saving operations during a UE positioning session. Aspects presented herein may also apply to both fast (dynamic) and slow network energy saving modes. For example, some network entities may be configured to dynamically switch its energy saving modes constantly based on the traffic load (e.g., switch to an energy saving mode whenever the traffic load is below a threshold), while other network entities may be configured to switch its energy saving modes based on a pre-defined timetable (e.g., switch to an energy saving mode during nights).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the LMF 166 may be configured to receive information indicative of a set of antenna panel configurations for a plurality of network nodes, where the set of antenna panel configurations is associated with a set of energy saving modes; and transmits an indication of one or more UL-SRS transmission parameters for a UE in a UE positioning session based on the information indicative of the set of antenna panel configurations for the plurality of network nodes (e.g., via the UE positioning configuration component 197).

In certain aspects, the base station 102 may be configured to transmit information indicative of a set of antenna panel configurations for the network node or for a plurality of network nodes including the network node, where the set of antenna panel configurations is associated with a set of energy saving modes; and receive an indication of one or more UL-SRS transmission parameters for a UE in a UE positioning session based on the information indicative of the set of antenna panel configurations for the plurality of network nodes (e.g., via the antenna configuration indication component 199).

Figure 2:
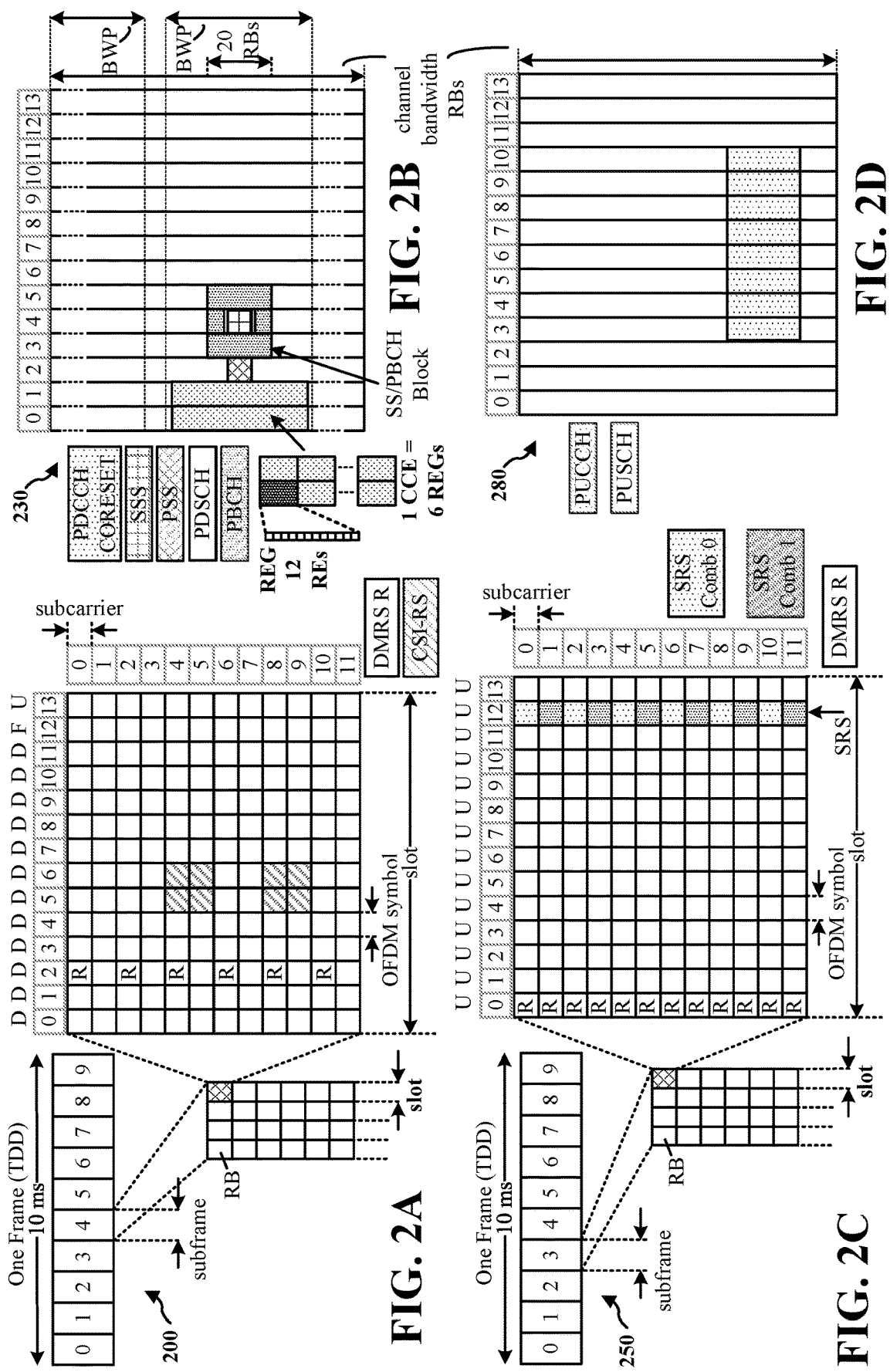
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS), which may also be referred to as UL-SRS (uplink-sounding reference signal). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
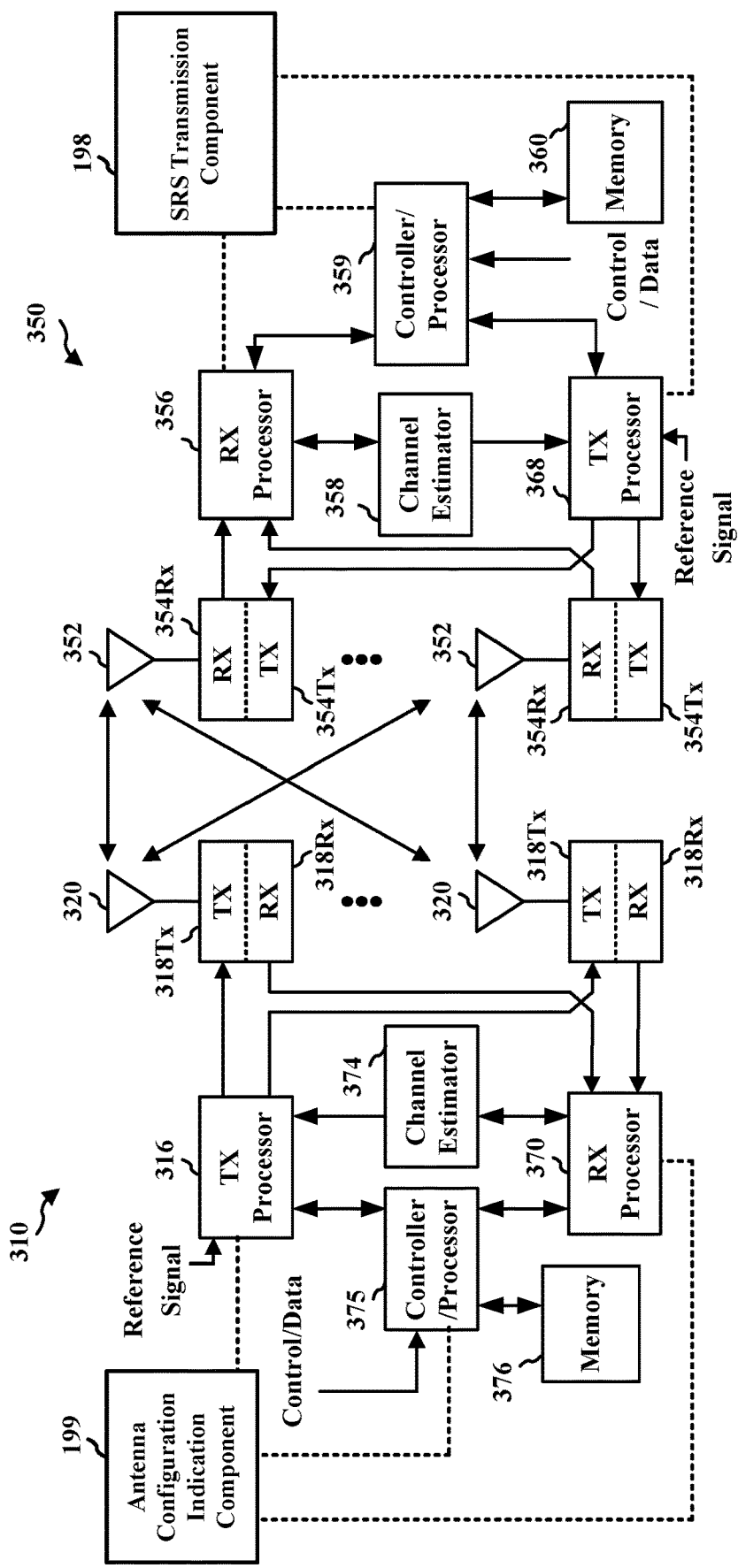
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SRS transmission component 198 of FIG. 1.

At least one of the TX processor 316, the RX processor 370, and the controller/processor 375 may be configured to perform aspects in connection with the antenna configuration indication component 199 of FIG. 1.

Figure 4:
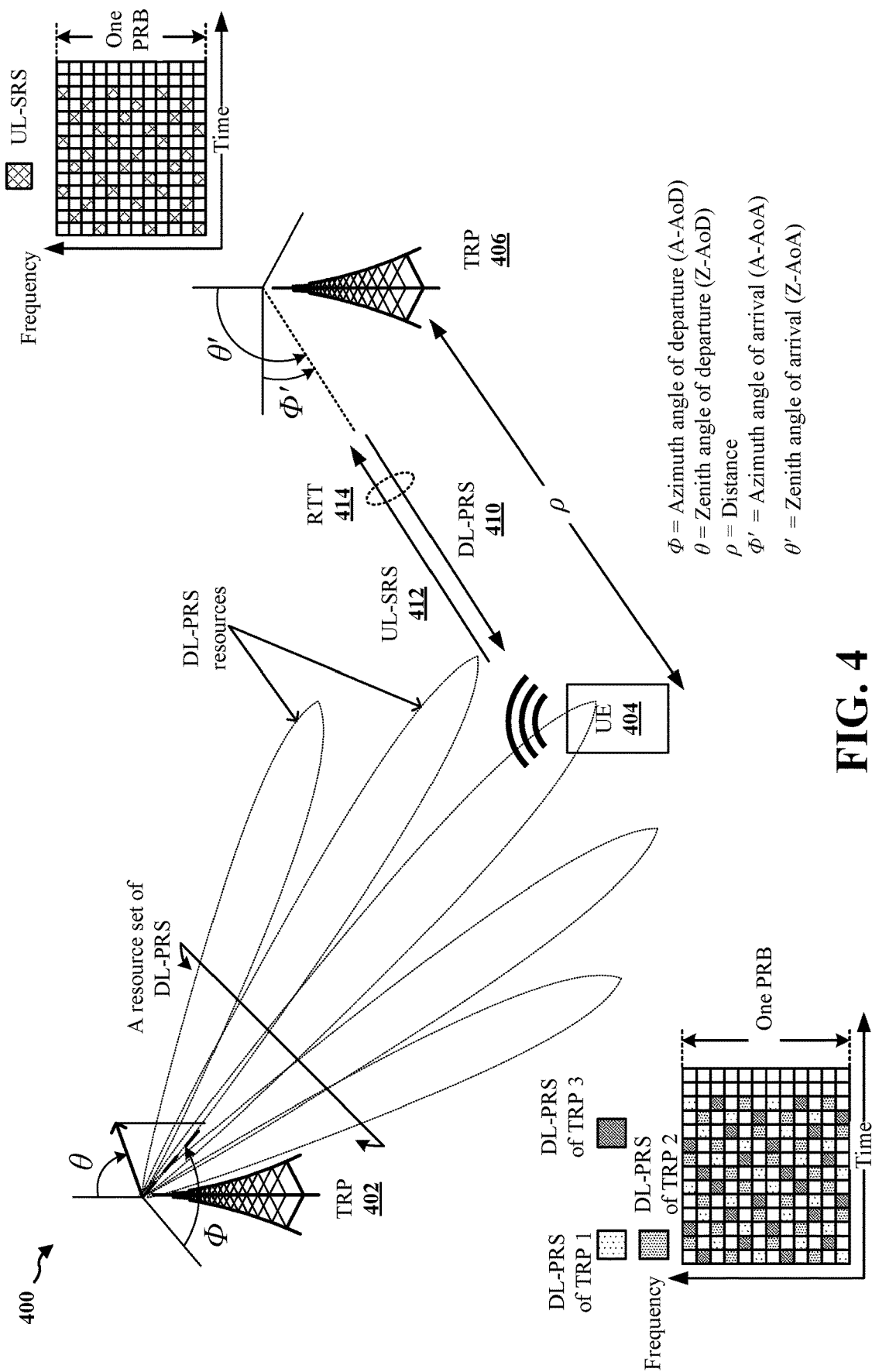
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Some wireless communications systems (e.g., green networks) may support techniques to reduce network power consumption. These power savings may, in some examples, occur during periods with low traffic volume (e.g., low load scenarios with low data arrival rates and fewer connected UEs). In such examples, network entities may reduce overall power consumption by using lower transmission powers and/or fewer antennas, which may be referred to as entering into an energy saving (ES) mode or a power saving mode. However, using reduced transmission powers and/or fewer antennas (e.g., entering into the network energy/power saving mode) may impact the accuracy of positioning procedures at other communication devices. For example, as UE positioning based on measuring UL-AoA relies on the number of antennas for accurate angle measurements, changing the number of receive antennas may impact the UL-AoA measurement accuracy.

As such, the accuracy of uplink-based positioning procedures may be adversely impacted if the network entity changes its operating modes (e.g., transmit/receive signals with different number of antennas) or uses different transmission/reception parameters (e.g., settings, configurations, etc.) for different energy saving modes. For example, a UE may be unable to receive PRS from a network entity/node or transmit SRS to the network entity/node if the network entity is operating with fewer antennas and/or with a reduced transmission/reception power. Thus, some uplink-based positioning procedures may not be suitable for wireless communication systems in which network entities frequently transition between different energy saving modes or energy saving operations.

Aspects presented herein may improve the accuracy of uplink-based positioning, such as the UL-AoA positioning, when a network entity/node participating in the uplink-based positioning is operating under an energy saving mode (e.g., operating with a reduced number of antennas, with a reduced power in transmission/reception, and/or with a reduced processing capability, etc.). In other words, aspects presented herein may provide enable a location server (e.g., an LMF) to account for different network power saving operations at different network nodes during a UE positioning session (e.g., an instance in which the position of the UE is to be determined based on at least one positioning mechanism, such as described in connection with FIG. 4). Aspects presented herein may also apply to both fast (dynamic) and slow network energy saving modes. For example, some network entities may be configured to dynamically switch its energy saving modes constantly based on the traffic load (e.g., switch to an energy saving mode whenever the traffic load is below a threshold), while other network entities may be configured to switch its energy saving modes based on a pre-defined timetable (e.g., switch to an energy saving mode during specific hours at nights).

Figure 5:
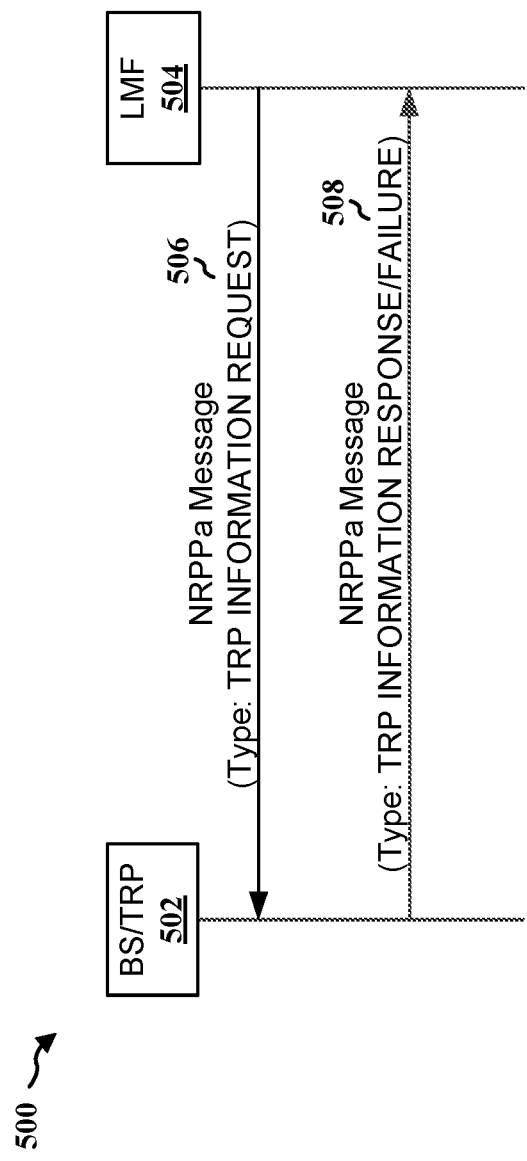
FIG. 5 is a communication flow illustrating an example of a location management function (LMF)-initiated transmission reception point (TRP) information exchange procedure in accordance with various aspects of the present disclosure.

FIG. 5 is a communication flow 500 illustrating an example of a location management function (LMF)-initiated transmission reception point (TRP) information exchange procedure in accordance with various aspects of the present disclosure. The numberings associated with the communication flow 500 do not specify a particular temporal order and are merely used as references for the communication flow 500. Aspects presented herein show an example TRP information exchange operation from a base station 502 (or a network entity) to an LMF 504 for an UL-AoA positioning session.

At 506, the LMF 504 may determine that certain TRP configuration information is desired (e.g., as part of a periodic update or as triggered by operations, administration and maintenance (OAM)) and send an NR Positioning Protocol A (NRPPa) TRP information request message to the base station 502. This TRP information request message may include an indication of which specific TRP configuration information is requested.

At 508, in response, the base station 502 may provide the requested TRP information in an NRPPa TRP information response message, if available at the base station 502. If the base station 502 is not able to provide any information, it may return an TRP information failure message indicating the cause of the failure.

Figure 6:
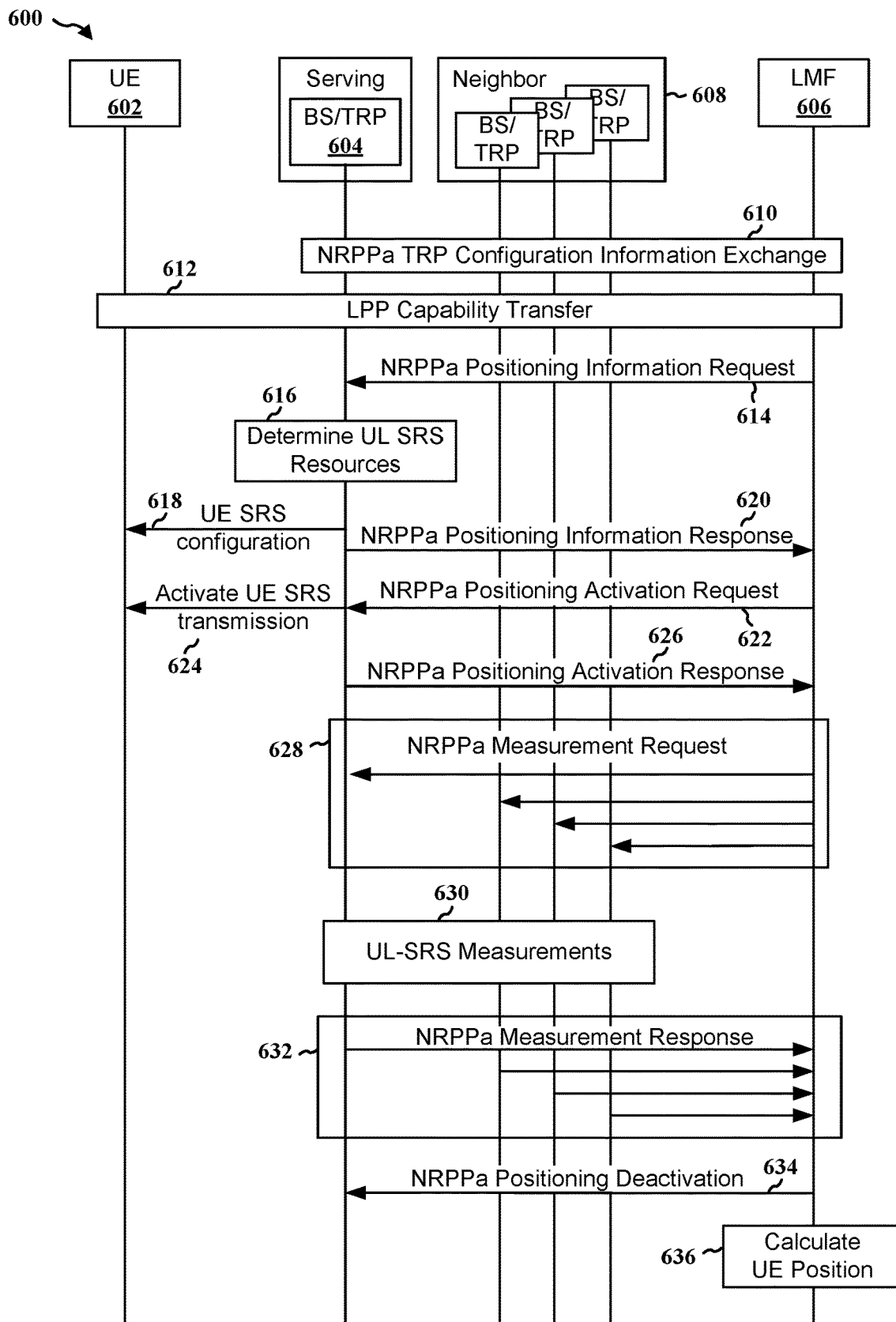
FIG. 6 is a communication flow illustrating an example UL angle-of-arrival (UL-AoA) positioning procedure in accordance with various aspects of the present disclosure.

FIG. 6 is a communication flow 600 illustrating an example UL-AoA positioning procedure in accordance with various aspects of the present disclosure. The numberings associated with the communication flow 600 do not specify a particular temporal order and are merely used as references for the communication flow 600. Aspects presented herein show an example procedure of an LMF 606 configuring a serving base station 604 and one or more neighboring base stations 608 to perform positioning of a target device (e.g., a UE 602) based on UL-AoA positioning.

At 610, the LMF 606 may use the procedure discussed in connection with FIG. 5 to obtain the TRP information specified for UL-AoA positioning from one or more base stations/TRPs, such from the serving base station 604 and one or more neighboring base stations 608.

At 612, the LMF 606 may request the positioning capabilities of the UE 602, such as using an LTE Positioning Protocol (LPP) capability transfer procedure.

At 614, the LMF 606 may send a NRPPa positioning information request message to the serving base station 604 to request UL-SRS configuration information for the UE 602.

At 616, the serving base station 604 may determine the resources available for UL-SRS and configure the UE 602 with the UL-SRS resource sets as shown at 618.

At 620, the serving base station 604 may provide the UL-SRS configuration information to the LMF 606, such as via a NRPPa positioning information response message.

At 622, in the case of semi-persistent (SP) or aperiodic (AP) SRS, the LMF 606 may request activation of UE SRS transmission by sending an NRPPa positioning activation request message to the serving base station 604 of the UE 602. Then, at 624 and 626, the serving base station 604 may activate the UL-SRS transmission for the UE 602 and send an NRPPA positioning activation response message. The UE 602 may begin the UL-SRS transmission according to the time domain behavior of the UL-SRS resource configuration.

At 628, the LMF 606 may provide the UL-SRS configuration to the selected serving base station 604 and one or more neighboring base stations 608 in a NRPPa measurement request message. The message may include all information specified to enable the serving base station 604/TRPs to perform the UL measurements.

At 630, each base station configured at 628 (e.g., the serving base station 604 and one or more neighboring base stations 608) may measure the UL-SRS transmissions from the UE 602.

At 632, each base station configured at 628 (e.g., the serving base station 604 and one or more neighboring base stations 608) may report the UL-SRS measurements to the LMF 606 in a NRPPa measurement response message.

At 634, the LMF 606 may send a NRPPa positioning deactivation message to the serving base station 604.

At 636, the LMF 606 may calculate and determine the position of the UE 602 based on the UL-SRS measurements obtained at 632.

In one aspect of the present disclosure, to improve the accuracy of uplink-based positioning (e.g., the UL-AoA positioning) when a network entity/node (e.g., the serving base station 604, the one or more neighboring base stations 608, etc.) participating in the uplink-based positioning is associated with at least one power saving mode, the network entity/node may be configured to provide/signal different sets of available antenna panel configurations for the supported power saving modes to a location server (e.g., the LMF 606). In some scenarios, different TRPs of a base station may support different antenna configurations across all/different power saving modes. For example, a first TRP may use four antenna panels for transmission/reception during a first power saving mode and use six antenna panels for transmission/reception during a second power saving mode, whereas a second TRP may use two antenna panels for transmission/reception during a first power saving mode and use four antenna panels for transmission/reception during a second power saving mode, etc. For purposes of the present disclosure, an antenna panel configuration may refer to a set of parameters associated with operating an antenna panel. For example, an antenna panel configuration may include directions of the antenna panel, the Tx/Rx power of the antenna panel, the number of antennas to be used (e.g., for azimuth and/or elevation measurement), etc.

In one example, each base station (e.g., the serving base station 604, the one or more neighboring base stations 608, etc.) may communicate its configurations associated with different power saving modes to the LMF (e.g., the LMF 606) directly, such as during the TRP configuration information exchange at 610 (or at 506 and 508 of FIG. 5). In another example, as an alternative, the serving base station may communicate its configurations associated with different power saving modes in addition to the configurations of the relevant neighboring base stations. For example, referring back to FIG. 6, the serving base station 604 may communicate (e.g., indicate or signal) its antenna configurations associated with different energy/power saving modes to the LMF 606 (e.g., at 610), and the serving base station 604 may also communicate the antenna configurations associated with different energy/power saving modes of the one or more neighboring base stations 608 to the LMF 606 (e.g., at 610). Under such configuration and setting, the one or more neighboring base stations 608 may be configured to indicate their antenna configurations to the serving base station 604 in a prior communication.

In another example, the information (e.g., the antenna configurations associated with different power saving modes) provided by a base station to an LMF may include at least one current antenna configuration used by relevant base station(s) and/or TRP(s) for UL-AoA positioning. In the UL-AoA positioning method, a UE's position may be estimated based on UL-AoA (and UL-SRS-RSRP and UL-SRS-RSRPP) of UL signals transmitted from the UE taken at different TRPs, along with other configuration information. For example, the information or the at least one current antenna configuration may include a number of antennas to be used in the UL azimuth angle measurement and/or a number of antennas to be used in the UL elevation angle measurement. For purposes of the present disclosure, under the global coordinate system (GCS), an azimuth angle measurement or an UL azimuth angle measurement may refer that an azimuth angle is measured counter-clockwise from the geographical North (e.g., from a TRP). For local coordinate system (LCS), the azimuth angle may be measured counter-clockwise from the x-axis of the LCS. On the other hand, an elevation angle measurement or an UL azimuth angle measurement may refer that, under the GCS, an elevation angle is measured relative to zenith and positive to the horizontal direction (e.g., elevation 0 degree points to zenith, 90 degrees to the horizon). For LCS, the elevation angle may be measured relative to the z-axis of the LCS (e.g., elevation 0 degree points to the z-axis, 90 degrees to the x-y plane).

As an illustration, referring back to FIG. 6, at 610, the serving base station 604 may indicate to the LMF 606 that during a normal operation (e.g., when the serving base station 604 is not in an energy saving mode), the serving base station 604 (or a specific set of TRPs of the serving base station 604) may use ten (10) antennas for measuring the UL azimuth angle of the SRSs transmitted from a UE (e.g., the UE 602) and twelve (12) antennas for measuring the UL elevation angle of the SRSs. The serving base station 604 may also indicate to the LMF 606 that during a first energy saving mode, the serving base station 604 (or a specific set of TRPs of the serving base station 604) may use six (6) antennas for measuring the UL azimuth angle of the SRSs and eight (8) antennas for measuring the UL elevation angle of the SRSs, and that during a second energy saving mode, the serving base station 604 (or a specific set of TRPs of the serving base station 604) may use four (4) antennas for measuring the UL azimuth angle of the SRSs and four (4) antennas for measuring the UL elevation angle of the SRSs, etc.

Based on the antenna configuration(s) associated with each TRP/base station and its corresponding energy saving mode, the LMF may determine and indicate/communicate its requested UL-SRS transmission characteristics to/with the serving base station, such as via an NRPPa message positioning information request as discussed in connection with 614 of FIG. 6. For example, after receiving the information/antenna configurations associated with different energy saving modes from the serving base station 604 (such as via NRPPa TRP configuration information exchange message as discussed at 610), the LMF 606 may determine one or more transmission characteristics/parameters for a set of SRSs to be transmitted by a UE (e.g., the UE 602) during the positioning session of the UE (e.g., which may be configured for the UE 602 by the serving base station 604 at 618).

In another aspect of the present disclosure, if there is a change in a base station (or TRP(s) of the base station)'s antenna configuration during a UE positioning session (e.g., during a duration in which a UE is configured to transmit SRSs), such as when the base station or TRP(s) enters to an energy saving mode or switch to a different energy saving mode, the base station may be configured to send an update message to the LMF indicating the change in its antenna configuration(s) (and/or changes in Tx/Rx power).

Figure 7:
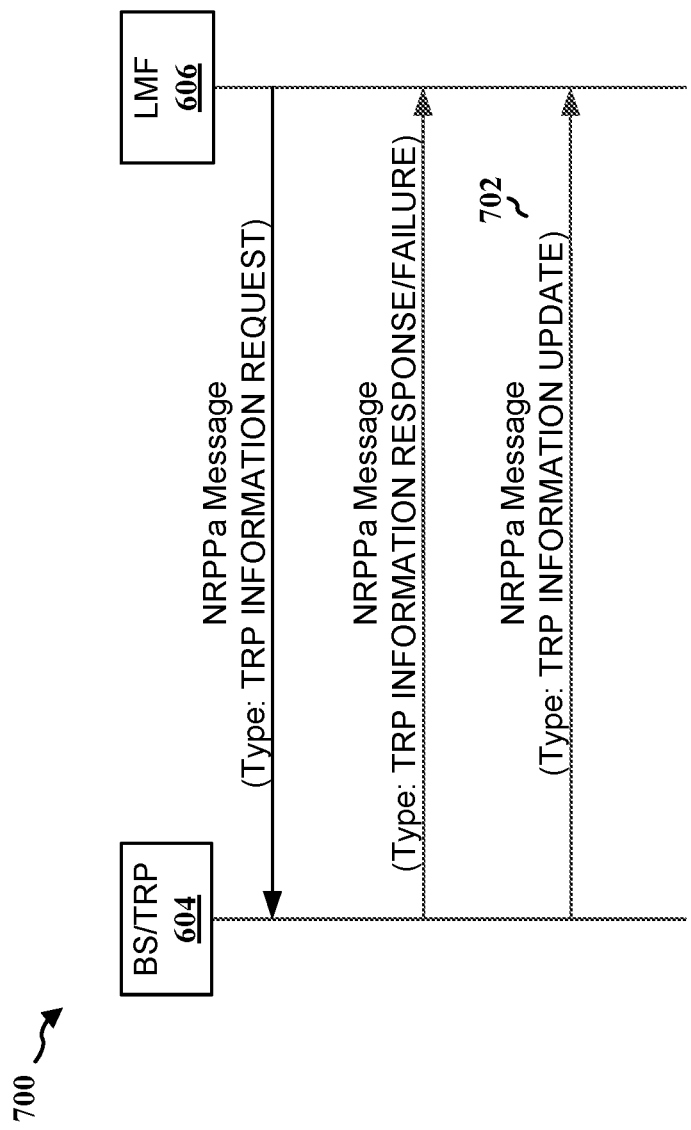
FIG. 7 is a communication flow illustrating an example of a base station sending an update of its antenna configuration(s) (or antenna configuration(s) of its TRP(s)) to an LMF via a TRP configuration information exchange procedure in accordance with various aspects of the present disclosure.

FIG. 7 is a communication flow 700 illustrating an example of a base station sending an update of its antenna configuration(s) (or antenna configuration(s) of its TRP(s)) to an LMF via a TRP configuration information exchange procedure in accordance with various aspects of the present disclosure. The numberings associated with the communication flow 700 do not specify a particular temporal order and are merely used as references for the communication flow 700.

As described in connection with 506 and 508 of FIGS. 5 and/or 610 of FIG. 6, an LMF (e.g., the LMF 606) may obtain TRP configuration information from a base station (e.g., the serving base station 604), such as by sending a TRP information request message to the base station and receive a TRP information response message from the base station. Thus, in another aspect of the present disclosure, if a change has occurred in the base station/TRP(s) antenna configuration during the UE SRS time duration (e.g., when the UE is transmitting SRSs for the UE positioning), as shown at 702 (which may be within 610 of FIG. 6), the base station may send a TRP information update message to the LMF. The TRP information update message may also be referred to as an indication of the antenna configuration change, and this TRP information update message may contain the antenna configuration mode(s) to be used by the base station/TRP(s).

In one example, a base station may be configured to transmit/signal the TRP information update message (e.g., the indication of the antenna configuration change) to an LMF if a certain number (or fraction) of the TRPs changed their antenna configurations. Such configuration may enable communication exchange messages between the base station and the LMF to be reduced. For example, if a base station (e.g., the serving base station 604) is using ten (10) TRPs for receiving SRSs transmitted from a UE (e.g., the UE 602), the base station may be configured to transmit the TRP information update message to an LMF (e.g., the LMF 606) if more than four (4) TRPs (e.g., a number threshold) or more than 40% of its TRPs (e.g., a percentage threshold) have changed their antenna configurations (e.g., by using more or less antennas for transmission/reception compared to previous transmission/reception occasion(s)). On the other hand, if less than four (4) TRPs or less than 40% of its TRPs have changed their antenna configurations, the base station may be refrained from transmitting the TRP information update message to the LMF to save communication exchange messages between the base station and the LMF.

In some examples, the number threshold or the percentage threshold that triggers a base station to send the TRP information update message to an LMF may be determined by the LMF and signaled to the base station. For example, the LMF 606 may determine that if more than four (4) TRPs or more than 40% of TRPs of the serving base station 604 have changed their antenna configurations, the serving base station 604 is specified to send a TRP information update message to the LMF 606 to report the updated antenna configurations for the TRP(s) (e.g., TRPs that have changed antenna configurations). Then, the LMF 606 may signal this determination (e.g., the determined number/percentage threshold) to the serving base station 604 for the serving base station 604 to apply.

Based on the TRP information update message from the base station, the LMF (e.g., the LMF 606) may update its measurements request to one or more base stations (e.g., the serving base station 604 and the one or more neighboring base stations 608), such as via a NRPPa measurement request message as described in connection with 628 of FIG. 6. For example, based on the update information, the LMF may abort SRS measurements from certain TRPs (e.g., TRPs that have changed antenna configurations or TRPs that use less than four antenna panels for Tx/Rx may be refrained from measuring SRSs). In another example, based on the update information, the LMF may request just one type of angle measurement from a TRP (e.g., just to compute/measure the azimuth angle or just to compute/measure the elevation angel, etc.).

In some scenarios, configuring a base station to send a TRP information update message when a certain number or percentage of its TRPs has changed antenna configuration(s) may be a suitable approach for a network adopting a slow energy saving mode (e.g., the network may be configured to switch its energy saving modes based on a pre-defined timetable, such as during specific hours at night), such configuration may not be a suitable approach for a network adopting a fast (dynamic) energy saving mode (e.g., the network may be configured to switch its energy saving modes dynamically, such as whenever the traffic load is below a threshold).

In another aspect of the present disclosure, in addition (or as an alternative) to configuring a base station to send a TRP information update message when a certain number or percentage of its TRPs has changed antenna configuration(s), an LMF may also be configured to specify a minimum number of antennas to be used for the angle computation (e.g., for computation of the azimuth angle and/or the elevation angle of the SRS) at a TRP (e.g., TRPs that are participating the UE positioning session). For example, referring back to FIG. 6, at 610 (or at 506 of FIG. 5), the LMF 606 may specify that at least N1 antennas are to be used for azimuth angle estimation at a TRP and/or at least N2 antennas are to be used for elevation angle estimation at a TRP (N1 and N2 being an integer or a percentage).

In response, the TRP may report the angle measurement value (e.g., at 632 of FIG. 6) if the number of antennas used by the TRP exceeds the preconfigured minimum number of antennas. For example, if the LMF 606 specifies that at least (or a minimum of) four (4) antennas are to be used for azimuth angle estimation at a TRP, then a TRP that uses at least four antennas for azimuth angle measurement may report its measurement (e.g., azimuth angle measurement of SRSs transmitted form a UE) and/or may participate in a UE positioning session. On the other hand, a TRP that uses less than four antennas for azimuth angle measurement may skip reporting its measurement or may be refrained from participating the UE positioning session. In another example, if the LMF 606 specifies that at least (or a minimum of) four (4) antennas are to be used for azimuth angle estimation and at least (or a minimum of) two (2) antennas are to be used for elevation angle estimation at a TRP, then a TRP that uses at least four antennas for azimuth angle measurement and at least two antennas for elevation angle measurement may report its measurement and/or may participate in the UE positioning session. On the other hand, a TRP that does not meet at least one of the criteria (e.g., using at least four antennas for azimuth angle estimation or at least two antennas for elevation angle estimation) may skip reporting its measurement or may be refrained from participating the UE positioning session. Such configuration may be suitable for a network operating based on a fast (dynamic) energy saving mode as an LMF may not be specified to wait for TRP information update message(s) from base stations participating in the UE positioning session.

In some examples, if the number of antennas in a current antenna configuration of a TRP is lower than the configured minimum number by the LMF, the TRP may be configured to report an error message, such as an indication of insufficient number of antennas. For example, if an LMF specifies that at least four (4) antennas are to be used for azimuth angle estimation, a TRP that is unable to measure the azimuth angle of SRSs using at least four antennas may transmit an indication of insufficient number of antennas (and/or a number of antennas currently supported) to the LMF. This configuration may enable additional network energy savings as a TRP may not monitor and measure the SRS if its configuration does not meet the LMF specifications.

Figure 8:
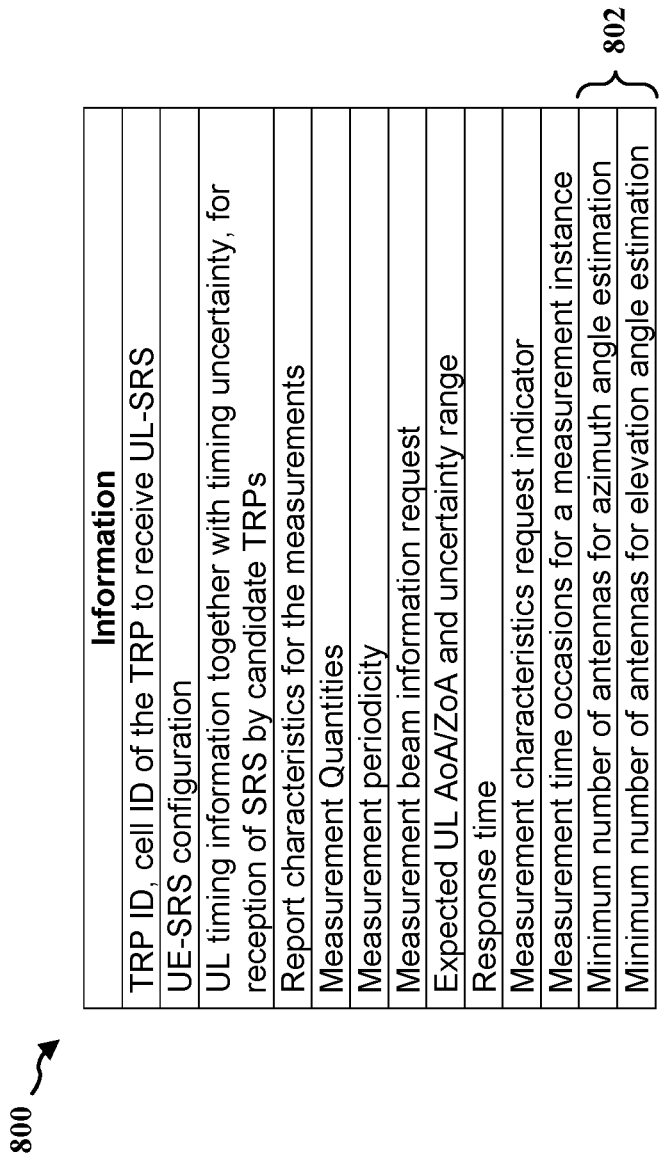
FIG. 8 is a diagram illustrating an example of an LMF using a TRP measurement request information message to indicate the minimum numbers of antennas to be used for azimuth angle estimation and/or elevation angle estimation to one or more base stations in accordance with various aspects of the present disclosure.

FIG. 8 is a diagram 800 illustrating an example of an LMF using a TRP measurement request information message to indicate the minimum numbers of antennas to be used for azimuth angle estimation and/or elevation angle estimation to one or more base stations in accordance with various aspects of the present disclosure. As shown at 802, an LMF (e.g., the LMF 606) may indicate a minimum number of antennas to be used for azimuth angle estimation (e.g., for measuring the azimuth angle of SRSs transmitted from the UE 602) and/or a minimum number of antennas to be used for elevation angle estimation (e.g., for measuring the elevation angle of SRSs transmitted from the UE 602) to one or more base stations (e.g., the serving base station 604 and the one or more neighboring base stations 608) via a NRPPa message (e.g., via a "TRP measurement request information" message).

In another aspect of the present disclosure, an LMF may request a minimum resolution capability and/or confidence metric per azimuth and/or per elevation from one or more base stations or TRPs. For example, as a higher number of antennas may provide a higher resolution (e.g., a higher accuracy of measurement), an LMF (e.g., at 610 of FIG. 6) may request a minimum resolution capability/value and/or confidence metric per azimuth and/or per elevation to be provided by a TRP. Thus, a TRP that meets the requested minimum resolution capability/value and/or confidence metric may report its measurement and/or participate in a UE positioning session, whereas a TRP that does not meet the requested minimum resolution capability/value and/or confidence metric may skip reporting its measurement and/or refrain from participating in the UE positioning session. Similarly, a TRP/base station may report its resolution capability along with confidence metric to the LMF with each measurement (e.g., at 632 of FIG. 6).

In another aspect of the present disclosure, a TRP may be configured to be associated with a validity timer in which the TRP may perform the SRS measurement or the TRP is to report its antenna configuration(s). For example, referring back to FIG. 5, at 508, the base station 502 may include an expiration timer that is associated with one or more TRPs of the base station 502 in the TRP information response/failure message. Based on the expiration timer, the LMF 504 may consider that the antenna configuration(s) at the one or more TRPs may be valid for the duration of the expiration timer. For example, the expiration timer may indicate that a TRP of the base station 502 will be valid for ten (10) minutes (or will apply certain antenna configuration for ten minutes). In some examples, the value of the expiration timer may be a function of the energy saving mode. For example, a first energy saving mode may be associated with a ten-minute expiration timer, and a second energy saving mode may be associated with a one-hour expiration timer, etc. Then, at the expiry of the expiration timer, the LMF may request an update of the TRP configuration from the TRP or the corresponding base station, or stop using the TRP for positioning measurement.

In another aspect of the present disclosure, in some scenarios, a TRP may not be able to support UL-AoA measurement under certain energy saving mode(s) (e.g., an energy saving mode of the TRP may disable UL-AoA measurement at the TRP). As such, the TRP may be configured to report an error in its measurement report to the LMF when the TRP is under an energy saving mode that does not support UL-AoA measurement (and also with a corresponding reason if available). Thus, the LMF may be aware of the TRP's inability to perform the UL-AoA measurement, and the LMF may exclude the measurement of the TRP from the UE positioning. In some examples, which energy saving modes are supported by a TRP may be determined solely by the TRP. In other examples, which energy saving modes are supported by a TRP may be determined by the LMF, such as based on the resolution capability information associated with each energy saving mode. In addition, the TRP or the base station may also communicate the set of energy saving modes that do not support UL-AoA to the LMF, and the LMF may exclude the TRP/base station from the UE positioning session when the TRP/base station is in an energy saving mode that does not support UL-AoA.

Figure 9:
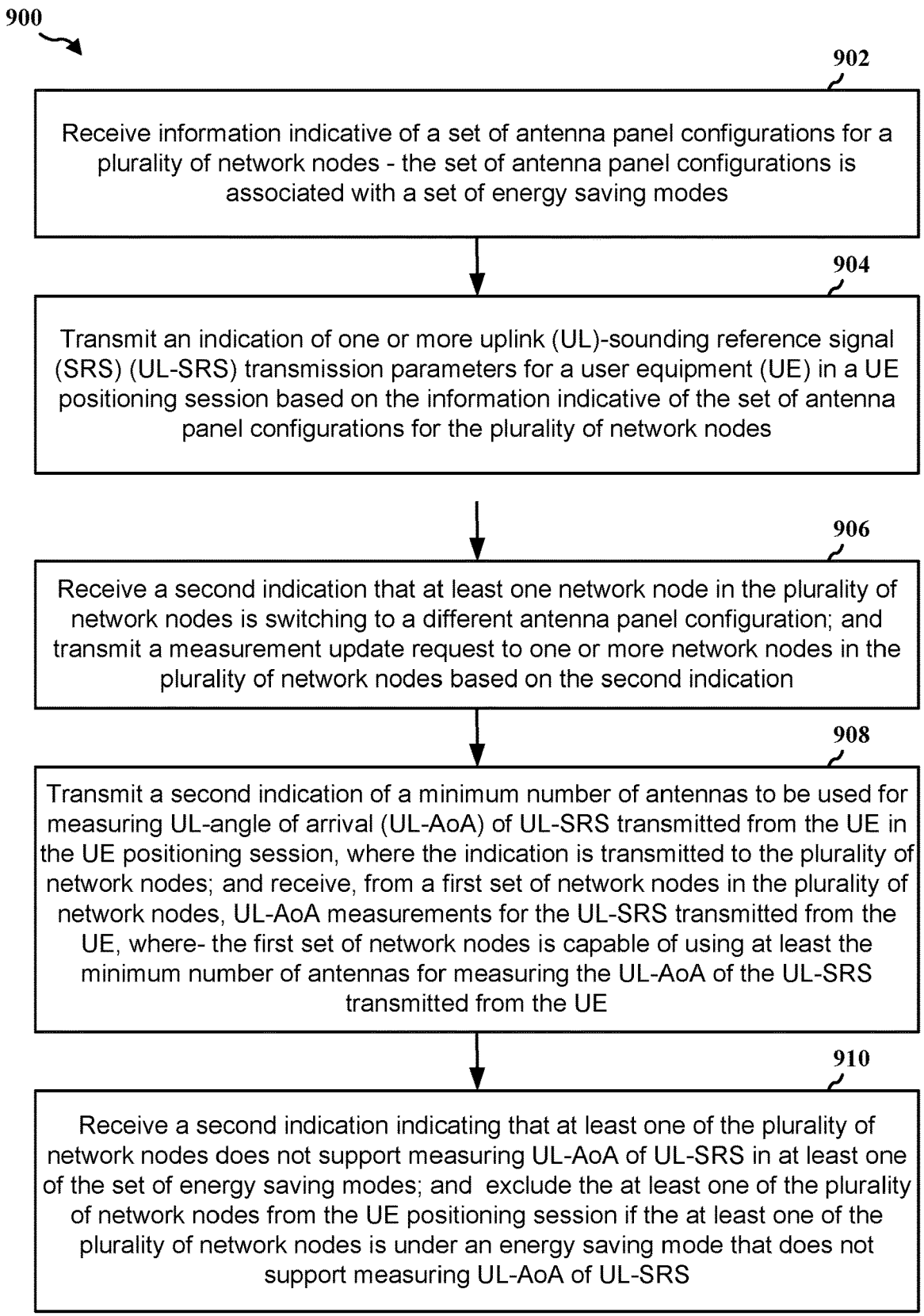
FIG. 9 is a flowchart of a method of wireless communication.

FIG. 9 is a flowchart 900 of a method of wireless communication. The method may be performed by a network entity (e.g., the LMF 166, 504, 606; the network entity 1160). The method may enable the network entity to account for different network energy/power saving operations at different base stations and TRPs during a UE positioning session to improve the efficiency and accuracy of the UE positioning.

At 902, the network entity may receive information indicative of a set of antenna panel configurations for a plurality of network nodes, where the set of antenna panel configurations is associated with a set of energy saving modes, such as described in connection with FIGS. 5 to 8. For example, at 610 of FIG. 6, the LMF 606 may receive TRP configuration information associated with the serving base station 604 and one or more neighboring base stations 608, such as shown at 802 of FIG. 8. The reception of the TRP configuration information may be performed by, e.g., the UE positioning configuration component 197, the network processor 1112, and/or the network interface 1180 of the network entity 1160 in FIG. 11.

In one example, the set of antenna panel configurations are different between two network nodes in the plurality of network nodes or between two energy saving modes in the set of energy saving modes.

In another example, each antenna panel configuration in the set of antenna panel configurations includes a first number of antennas to be used in an UL azimuth angle measurement and a second number of antennas to be used in an UL elevation angle measurement under one energy saving mode in the set of energy saving modes In another example, the set of antenna panel configurations for each of the plurality of network nodes is received from each corresponding network node.

In another example, the plurality of network nodes includes a serving network node of the UE and one or more non-serving network nodes, and the network entity may receive the set of antenna panel configurations for the one or more non-serving network nodes via the serving network node.

In another example, the network entity is a location server or an LMF, and the plurality of network nodes includes at least one base station, a component of the at least one base station, at least one TRP, or a combination thereof.

In another example, each antenna panel configuration in the set of antenna panel configurations is associated with a timer. In such an example, the timer is a function of a corresponding energy saving mode. In such an example, the network entity may transmit a request to report an updated antenna panel configuration to a network node in the plurality of network nodes if the timer associated with an antenna panel configuration of the network node expires.

At 904, the network entity may transmit an indication of one or more UL-SRS transmission parameters for a UE in a UE positioning session based on the information indicative of the set of antenna panel configurations for the plurality of network nodes, such as described in connection with FIG. 6. For example, at 628, the LMF 606 may transmit an indication of one or more UL-SRS transmission parameters for the UE 602 in a UE positioning session based on the TRP configuration information which indicates the set of antenna panel configurations for the serving base station 604 and one or more neighboring base stations 608. The transmission of the indication of one or more UL-SRS transmission parameters for a UE may be performed by, e.g., the UE positioning configuration component 197, the network processor 1112, and/or the network interface 1180 of the network entity 1160 in FIG. 11.

In one example, the network entity may transmit the one or more UL-SRS transmission parameters to the UE via a serving network node of the UE.

In another example, the indication is associated with a configuration of the UE to transmit a set of UL-SRSs to the plurality of network nodes based on the one or more UL-SRS transmission parameters.

In another example, the information further includes a current antenna configuration used by each of the plurality of network nodes for receiving the set of UL-SRSs from the UE or for measuring UL-AoA of the set of UL-SRSs.

At 906, the network entity may receive a second indication that at least one network node in the plurality of network nodes is switching to a different antenna panel configuration, and the network entity may transmit a measurement update request to one or more network nodes in the plurality of network nodes based on the second indication, such as described in connection with FIGS. 6 and 7. For example, at 702 of FIG. 7, the LMF 606 may receive a TRP information update message from the serving base station 604 indicating that at least one TRP is switching to a different antenna panel configuration. In response, at 628 of FIG. 6, the LMF 606 may transmit a measurement update request to the serving base station 604 and the one or more neighboring base stations 608 based on the TRP information update message. The reception of the second indication and/or the transmission of the measurement update request may be performed by, e.g., the UE positioning configuration component 197, the network processor 1112, and/or the network interface 1180 of the network entity 1160 in FIG. 11. In one example, the second indication is received based on a defined number of network nodes or a defined fraction of network nodes in the plurality of network nodes switching to the different antenna panel configuration.

At 908, the network entity may transmit a second indication of a minimum number of antennas to be used for measuring UL-AoA of a set of UL-SRSs transmitted from the UE in the UE positioning session, where the indication is transmitted to the plurality of network nodes, and the network entity may receive, from a first set of network nodes in the plurality of network nodes, UL-AoA measurements for the set of UL-SRSs transmitted from the UE, where the first set of network nodes is capable of using at least the minimum number of antennas for measuring the UL-AoA of the set of UL-SRSs transmitted from the UE, such as described in connection with FIGS. 5-7. For example, at 610 of FIG. 6, the LMF 606 may transmit an indication of a minimum number of antennas to be used for measuring UL-AoA of a set of UL-SRSs transmitted from the UE 602 to the serving base station 604 and the one or more neighboring base stations 608. In response, the LMF 606 may receive UL-AoA measurements for the set of UL-SRSs transmitted from the UE 602 from TRPs/base stations that are capable of using at least the minimum number of antennas for measuring the UL-AoA of the set of UL-SRSs transmitted from the UE 602. The transmission of the second indication and/or the reception of UL-AoA measurements may be performed by, e.g., the UE positioning configuration component 197, the network processor 1112, and/or the network interface 1180 of the network entity 1160 in FIG. 11.

In one example, the minimum number of antennas include at least one of: a first minimum number of antennas to be used for an azimuth angle estimation, or a second minimum number of antennas to be used for an elevation angle estimation.

In another example, the network entity may receive a notification from a second set of network nodes in the plurality of network nodes indicating that the second set of network nodes is incapable of using at least the minimum number of antennas for measuring the UL-AoA of the set of UL-SRSs transmitted from the UE. In such an example, the second set of network nodes is configured to skip monitoring the set of UL-SRSs transmitted from the UE.

In another example, the second indication of the minimum number of antennas to be used for measuring the UL-AoA is transmitted to the plurality of network nodes via a measurement request information message.

At 910, the network entity may receive a second indication indicating that at least one of the plurality of network nodes does not support measuring UL-AoA of UL-SRS in at least one of the set of energy saving modes, and the network entity may exclude the at least one of the plurality of network nodes from the UE positioning session if the at least one of the plurality of network nodes is under an energy saving mode that does not support measuring UL-AoA of UL-SRS, such as described in connection with FIGS. 5 to 8. For example, at 610 of FIG. 6, the LMF 606 may receive an indication indicating that a TRP does not support measuring UL-AoA of UL-SRS in certain energy saving modes, and the LMF 606 may exclude the TRP from the UE positioning session if the TRP is under an energy saving mode that does not support measuring UL-AoA of UL-SRS. The reception of the second indication and/or the exclusion of the at least one of the plurality of network nodes from the UE positioning session may be performed by, e.g., the UE positioning configuration component 197, the network processor 1112, and/or the network interface 1180 of the network entity 1160 in FIG. 11.

Figure 10:
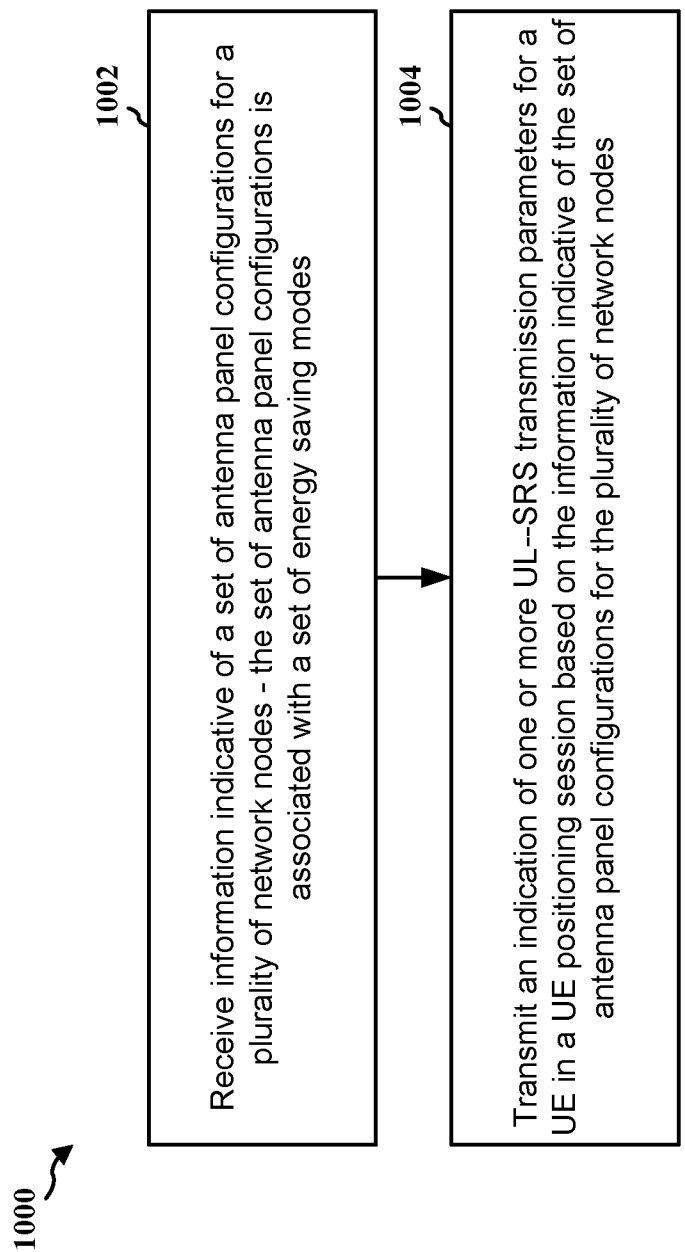
FIG. 10 is a flowchart of a method of wireless communication.

FIG. 10 is a flowchart 1000 of a method of wireless communication. The method may be performed by a network entity (e.g., the LMF 166, 504, 606; the network entity 1160). The method may enable the network entity to account for different network energy/power saving operations at different base stations and TRPs during a UE positioning session to improve the efficiency and accuracy of the UE positioning.

At 1002, the network entity may receive information indicative of a set of antenna panel configurations for a plurality of network nodes, where the set of antenna panel configurations is associated with a set of energy saving modes, such as described in connection with FIGS. 5 to 8. For example, at 610 of FIG. 6, the LMF 606 may receive TRP configuration information associated with the serving base station 604 and one or more neighboring base stations 608, where the TRP configuration information is associated with a set of energy saving modes, such as shown at 802 of FIG. 8. The reception of the TRP configuration information may be performed by, e.g., the UE positioning configuration component 197, the network processor 1112, and/or the network interface 1180 of the network entity 1160 in FIG. 11.

In one example, the set of antenna panel configurations are different between two network nodes in the plurality of network nodes or between two energy saving modes in the set of energy saving modes.

In another example, each antenna panel configuration in the set of antenna panel configurations includes a first number of antennas to be used in an UL azimuth angle measurement and a second number of antennas to be used in an UL elevation angle measurement under one energy saving mode in the set of energy saving modes.

In another example, the set of antenna panel configurations for each of the plurality of network nodes is received from each corresponding network node.

In another example, the plurality of network nodes includes a serving network node of the UE and one or more non-serving network nodes, and the network entity may receive the set of antenna panel configurations for the one or more non-serving network nodes via the serving network node.

In another example, the network entity is a location server or an LMF, and the plurality of network nodes includes at least one base station, a component of the at least one base station, at least one TRP, or a combination thereof.

In another example, each antenna panel configuration in the set of antenna panel configurations is associated with a timer. In such an example, the timer is a function of a corresponding energy saving mode. In such an example, the network entity may transmit a request to report an updated antenna panel configuration to a network node in the plurality of network nodes if the timer associated with an antenna panel configuration of the network node expires.

At 1004, the network entity may transmit an indication of one or more UL-SRS transmission parameters for a UE in a UE positioning session based on the information indicative of the set of antenna panel configurations for the plurality of network nodes, such as described in connection with FIG. 6. For example, at 628, the LMF 606 may transmit an indication of one or more UL-SRS transmission parameters for the UE 602 in a UE positioning session based on the TRP configuration information which indicates the set of antenna panel configurations for the serving base station 604 and one or more neighboring base stations 608. The transmission of the indication of one or more UL-SRS transmission parameters for a UE may be performed by, e.g., the UE positioning configuration component 197, the network processor 1112, and/or the network interface 1180 of the network entity 1160 in FIG. 11.

In one example, the network entity may transmit the one or more UL-SRS transmission parameters to the UE via a serving network node of the UE.

In another example, where the indication is associated with a configuration of the UE to transmit a set of UL-SRSs to the plurality of network nodes based on the one or more UL-SRS transmission parameters.

In another example, the information further includes a current antenna configuration used by each of the plurality of network nodes for receiving the set of UL-SRSs from the UE or for measuring UL-AoA of the set of UL-SRSs.

In another example, the network entity may receive a second indication that at least one network node in the plurality of network nodes is switching to a different antenna panel configuration, and the network entity may transmit a measurement update request to one or more network nodes in the plurality of network nodes based on the second indication, such as described in connection with FIGS. 6 and 7. For example, at 702 of FIG. 7, the LMF 606 may receive a TRP information update message from the serving base station 604 indicating that at least one TRP is switching to a different antenna panel configuration. In response, at 628 of FIG. 6, the LMF 606 may transmit a measurement update request to the serving base station 604 and the one or more neighboring base stations 608 based on the TRP information update message. The reception of the second indication and/or the transmission of the measurement update request may be performed by, e.g., the UE positioning configuration component 197, the network processor 1112, and/or the network interface 1180 of the network entity 1160 in FIG. 11. In one example, the second indication is received based on a defined number of network nodes or a defined fraction of network nodes in the plurality of network nodes switching to the different antenna panel configuration.

In another example, the network entity may transmit a second indication of a minimum number of antennas to be used for measuring UL-AoA of a set of UL-SRSs transmitted from the UE in the UE positioning session, where the indication is transmitted to the plurality of network nodes, and the network entity may receive, from a first set of network nodes in the plurality of network nodes, UL-AoA measurements for the set of UL-SRSs transmitted from the UE, where the first set of network nodes is capable of using at least the minimum number of antennas for measuring the UL-AoA of the set of UL-SRSs transmitted from the UE, such as described in connection with FIGS. 5-7. For example, at 610 of FIG. 6, the LMF 606 may transmit an indication of a minimum number of antennas to be used for measuring UL-AoA of a set of UL-SRSs transmitted from the UE 602 to the serving base station 604 and the one or more neighboring base stations 608. In response, the LMF 606 may receive UL-AoA measurements for the set of UL-SRSs transmitted from the UE 602 from TRPs/base stations that are capable of using at least the minimum number of antennas for measuring the UL-AoA of the set of UL-SRS s transmitted from the UE 602. The transmission of the second indication and/or the reception of UL-AoA measurements may be performed by, e.g., the UE positioning configuration component 197, the network processor 1112, and/or the network interface 1180 of the network entity 1160 in FIG. 11. In one example, the minimum number of antennas include at least one of: a first minimum number of antennas to be used for an azimuth angle estimation, or a second minimum number of antennas to be used for an elevation angle estimation. In another example, the network entity may receive a notification from a second set of network nodes in the plurality of network nodes indicating that the second set of network nodes is incapable of using at least the minimum number of antennas for measuring the UL-AoA of the set of UL-SRS s transmitted from the UE. In such an example, the second set of network nodes is configured to skip monitoring the set of UL-SRSs transmitted from the UE. In another example, the second indication of the minimum number of antennas to be used for measuring the UL-AoA is transmitted to the plurality of network nodes via a measurement request information message.

In another example, the network entity may receive a second indication indicating that at least one of the plurality of network nodes does not support measuring UL-AoA of UL-SRS in at least one of the set of energy saving modes, and the network entity may exclude the at least one of the plurality of network nodes from the UE positioning session if the at least one of the plurality of network nodes is under an energy saving mode that does not support measuring UL-AoA of UL-SRS, such as described in connection with FIGS. 5 to 8. For example, at 610 of FIG. 6, the LMF 606 may receive an indication indicating that a TRP does not support measuring UL-AoA of UL-SRS in certain energy saving modes, and the LMF 606 may exclude the TRP from the UE positioning session if the TRP is under an energy saving mode that does not support measuring UL-AoA of UL-SRS. The reception of the second indication and/or the exclusion of the at least one of the plurality of network nodes from the UE positioning session may be performed by, e.g., the UE positioning configuration component 197, the network processor 1112, and/or the network interface 1180 of the network entity 1160 in FIG. 11.

Figure 11:
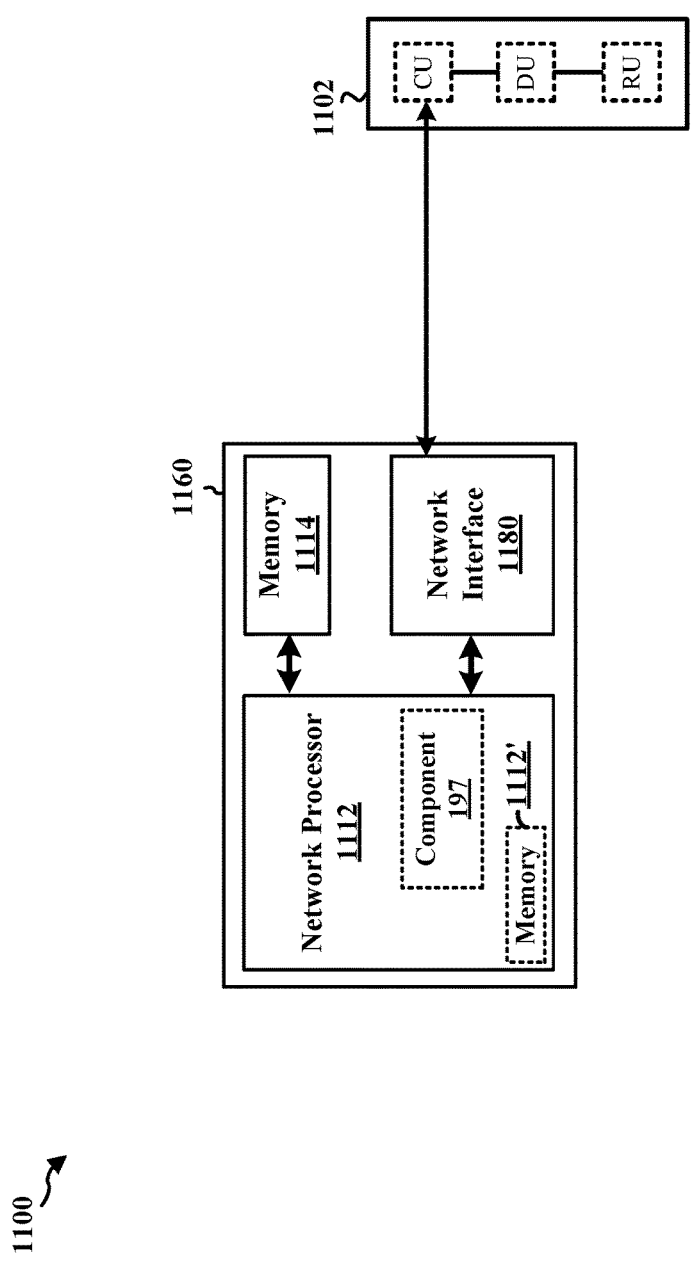
FIG. 11 is a diagram illustrating an example of a hardware implementation for a network entity.

FIG. 11 is a diagram 1100 illustrating an example of a hardware implementation for a network entity 1160. In one example, the network entity 1160 may be within the core network 120. The network entity 1160 may include a network processor 1112. The network processor 1112 may include on-chip memory 1112'. In some aspects, the network entity 1160 may further include additional memory modules 1114. The network entity 1160 communicates via the network interface 1180 directly (e.g., backhaul link) or indirectly (e.g., through a RIC) with the CU 1102. The on-chip memory 1112' and the additional memory modules 1114 may each be considered a computer-readable medium/memory. Each computer-readable medium/memory may be non-transitory. The processor 1112 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the UE positioning configuration component 197 is configured to receive information indicative of a set of antenna panel configurations for a plurality of network nodes, where the set of antenna panel configurations is associated with a set of energy saving modes. The UE positioning configuration component 197 may also be configured to transmit an indication of one or more UL-SRS transmission parameters for a UE in a UE positioning session based on the information indicative of the set of antenna panel configurations for the plurality of network nodes. The UE positioning configuration component 197 may be within the processor 1112. The UE positioning configuration component 197 may be one or more hardware components specifically configured to carry out the stated processes/algorithm, implemented by one or more processors specifically configured to perform the stated processes/algorithm, stored within a computer-readable medium for implementation by one or more processors, or some combination thereof. The network entity 1160 may include a variety of components configured for various functions. In one configuration, the network entity 1160 includes means for receiving information indicative of a set of antenna panel configurations for a plurality of network nodes, where the set of antenna panel configurations is associated with a set of energy saving modes. The network entity 1160 may further include means for transmitting an indication of one or more UL-SRS transmission parameters for a UE in a UE positioning session based on the information indicative of the set of antenna panel configurations for the plurality of network nodes.

In one configuration, the set of antenna panel configurations are different between two network nodes in the plurality of network nodes or between two energy saving modes in the set of energy saving modes.

In another configuration, each antenna panel configuration in the set of antenna panel configurations includes a first number of antennas to be used in an UL azimuth angle measurement and a second number of antennas to be used in an UL elevation angle measurement under one energy saving mode in the set of energy saving modes.

In another configuration, the indication is associated with a configuration of the UE to transmit a set of UL-SRSs to the plurality of network nodes based on the one or more UL-SRS transmission parameters.

In another configuration, the set of antenna panel configurations for each of the plurality of network nodes is received from each corresponding network node.

In another configuration, the plurality of network nodes includes a serving network node of the UE and one or more non-serving network nodes, and the network entity 1160 may further include means for receiving the set of antenna panel configurations for the one or more non-serving network nodes via the serving network node.

In another configuration, the network entity is a location server or an LMF, and the plurality of network nodes includes at least one base station, a component of the at least one base station, at least one TRP, or a combination thereof.

In another configuration, each antenna panel configuration in the set of antenna panel configurations is associated with a timer. In such a configuration, the timer is a function of a corresponding energy saving mode. In such a configuration, the network entity 1160 may further include means for transmitting a request to report an updated antenna panel configuration to a network node in the plurality of network nodes if the timer associated with an antenna panel configuration of the network node expires.

In another configuration, the network entity 1160 may further include means for transmitting the one or more UL-SRS transmission parameters to the UE via a serving network node of the UE.

In another configuration, the information further includes a current antenna configuration used by each of the plurality of network nodes for receiving the set of UL-SRSs from the UE or for measuring UL-AoA of the set of UL-SRSs.

In another configuration, the network entity 1160 may further include means for receiving a second indication that at least one network node in the plurality of network nodes is switching to a different antenna panel configuration, and means for transmitting a measurement update request to one or more network nodes in the plurality of network nodes based on the second indication. In such a configuration, the second indication is received based on a defined number of network nodes or a defined fraction of network nodes in the plurality of network nodes switching to the different antenna panel configuration.

In another configuration, the network entity 1160 may further include means for transmitting a second indication of a minimum number of antennas to be used for measuring UL-AoA of a set of UL-SRSs transmitted from the UE in the UE positioning session, where the indication is transmitted to the plurality of network nodes, and means for receiving, from a first set of network nodes in the plurality of network nodes, UL-AoA measurements for the set of UL-SRSs transmitted from the UE, where the first set of network nodes is capable of using at least the minimum number of antennas for measuring the UL-AoA of the set of UL-SRSs transmitted from the UE. In such a configuration, the minimum number of antennas include at least one of: a first minimum number of antennas to be used for an azimuth angle estimation, or a second minimum number of antennas to be used for an elevation angle estimation. In another configuration, the network entity 1160 may further include means for receiving a notification from a second set of network nodes in the plurality of network nodes indicating that the second set of network nodes is incapable of using at least the minimum number of antennas for measuring the UL-AoA of the set of UL-SRSs transmitted from the UE. In such a configuration, the second set of network nodes is configured to skip monitoring the set of UL-SRSs transmitted from the UE. In another configuration, the second indication of the minimum number of antennas to be used for measuring the UL-AoA is transmitted to the plurality of network nodes via a measurement request information message.

In another configuration, the network entity 1160 may further include means for receiving a second indication indicating that at least one of the plurality of network nodes does not support measuring UL-AoA of UL-SRS in at least one of the set of energy saving modes, and means for excluding the at least one of the plurality of network nodes from the UE positioning session if the at least one of the plurality of network nodes is under an energy saving mode that does not support measuring UL-AoA of UL-SRS.

The means may be the UE positioning configuration component 197 of the network entity 1160 configured to perform the functions recited by the means.

Figure 12:
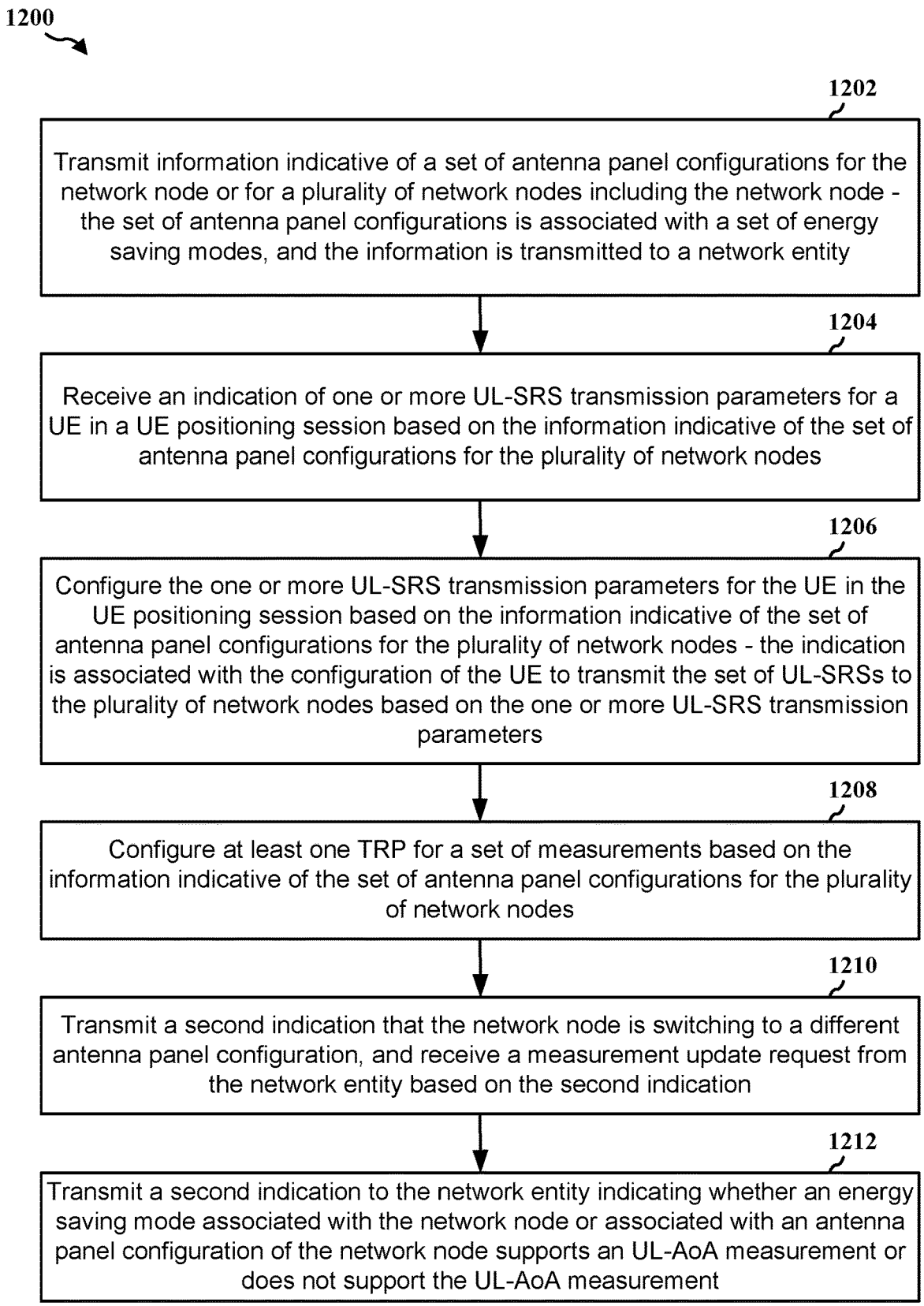
FIG. 12 is a flowchart of a method of wireless communication.

FIG. 12 is a flowchart 1200 of a method of wireless communication. The method may be performed by a base station (e.g., the base station 102, 502; the serving base station 604; the one or more neighboring base stations 608; the network entity 1402). The method may enable the base station to report different network energy/power saving operations associated with its TRPs during a UE positioning session to improve the efficiency and accuracy of the UE positioning.

At 1202, the base station may transmit information indicative of a set of antenna panel configurations for the network node or for a plurality of network nodes including the network node, where the set of antenna panel configurations is associated with a set of energy saving modes, where the information is transmitted to a network entity, such as described in connection with FIGS. 5 to 8. For example, at 610 of FIG. 6, the serving base station 604 and the one or more neighboring base stations 608 may transmit their TRP configuration information to the LMF 606, where the TRP configuration information is associated with a set of energy saving modes, such as shown at 802 of FIG. 8. The transmission of the information indicative of a set of antenna panel configurations may be performed by, e.g., the antenna configuration indication component 199 and/or the communication interface 1418, 1438, and/or 1448 of the network entity 1402 in FIG. 14.

In one example, each antenna panel configuration in the set of antenna panel configurations includes a first number of antennas to be used in an UL azimuth angle measurement and a second number of antennas to be used in an UL elevation angle measurement under one energy saving mode in the set of energy saving modes.

At 1204, the base station may receive an indication of one or more UL-SRS transmission parameters for a UE in a UE positioning session based on the information indicative of the set of antenna panel configurations for the plurality of network nodes, such as described in connection with FIG. 6. For example, at 628, the serving base station 604 and one or more neighboring base stations 608 may receive an indication of one or more UL-SRS transmission parameters for the UE 602 in a UE positioning session from the LMF 606 based on the TRP configuration information which indicates the set of antenna panel configurations for the serving base station 604 and one or more neighboring base stations 608. The reception of the indication of one or more UL-SRS transmission parameters may be performed by, e.g., the antenna configuration indication component 199 and/or the communication interface 1418, 1438, and/or 1448 of the network entity 1402 in FIG. 14.

In one example, the set of antenna panel configurations are different between two energy saving modes in the set of energy saving modes.

In another example, the indication is associated with a configuration of the UE to transmit a set of UL-SRSs to the plurality of network nodes based on the one or more UL-SRS transmission parameters.

In another example, the information further includes a current antenna configuration used by the network node for receiving the set of UL-SRSs from the UE or for measuring UL-AoA of the set of UL-SRSs.

In another example, the network entity is a location server or an LMF, and the network node is a base station, a component of the base station, or a TRP.

In another example, each antenna panel configuration in the set of antenna panel configurations is associated with a timer. In such an example, the timer is a function of a corresponding energy saving mode. In such an example, the base station may receive a request to report an updated antenna panel configuration if the timer associated with an antenna panel configuration expires.

At 1206, the base station may configure the one or more UL-SRS transmission parameters for the UE in the UE positioning session based on the information indicative of the set of antenna panel configurations for the plurality of network nodes, where the indication is associated with the configuration of the UE to transmit the set of UL-SRSs to the plurality of network nodes based on the one or more UL-SRS transmission parameters, such as described in connection with FIG. 6. For example, at 618, the serving base station 604 configure SRS transmission parameters for the UE 602 in the UE positioning session based on the information indicative of the set of antenna panel configurations for the serving base station 604 and one or more neighboring base stations 608, where the indication is associated with the configuration of the UE to transmit the set of UL-SRSs to the plurality of network nodes based on the one or more UL-SRS transmission parameters. The configuration of the one or more UL-SRS transmission parameters may be performed by, e.g., the antenna configuration indication component 199 and/or the communication interface 1418, 1438, and/or 1448 of the network entity 1402 in FIG. 14.

At 1208, the base station may configure at least one TRP for a set of measurements based on the information indicative of the set of antenna panel configurations for the plurality of network nodes, such as described in connection with FIG. 6. For example, at 628 of FIG. 6, the serving base station 604 may configure at least one TRP for a set of measurements based on the information indicative of the set of antenna panel configurations for the serving base station 604. The configuration of the at least one TRP may be performed by, e.g., the antenna configuration indication component 199 and/or the communication interface 1418, 1438, and/or 1448 of the network entity 1402 in FIG. 14.

At 1210, the base station may transmit a second indication that the network node is switching to a different antenna panel configuration, and the base station may receive a measurement update request from the network entity based on the second indication, such as described in connection with FIGS. 6 and 7. For example, at 702 of FIG. 7, the serving base station 604 may transmit a TRP information update message to the LMF 606 indicating that at least one TRP is switching to a different antenna panel configuration. In response, at 628 of FIG. 6, the serving base station 604 may receive a measurement update request from the LMF 606 based on the TRP information update message. The transmission of the second indication and/or the reception of the measurement update request may be performed by, e.g., the antenna configuration indication component 199 and/or the communication interface 1418, 1438, and/or 1448 of the network entity 1402 in FIG. 14. In one example, the second indication is transmitted based on a defined number of network nodes switching to different antenna panel configurations.

At 1212, the base station may transmit a second indication to the network entity indicating whether an energy saving mode associated with the network node or associated with an antenna panel configuration of the network node supports an UL-AoA measurement or does not support the UL-AoA measurement, such as described in connection with FIGS. 5 to 8. For example, at 610 of FIG. 6, the serving base station 604 may transmit an indication indicating that a TRP does not support measuring UL-AoA of UL-SRS in certain energy saving modes to the LMF 606. The transmission of the second indication may be performed by, e.g., the antenna configuration indication component 199 and/or the communication interface 1418, 1438, and/or 1448 of the network entity 1402 in FIG. 14.

In one example, the base station may receive a second indication of a minimum number of antennas to be used for measuring UL-AoA of UL-SRS transmitted from the UE in the UE positioning session, where the indication is received from the network entity, and the base station may transmit, to the network entity, UL-AoA measurements for the set of UL-SRSs transmitted from the UE if the network node is capable of measuring the UL-AoA of the set of UL-SRSs transmitted from the UE using at least the minimum number of antennas. In such an example, the minimum number of antennas include at least one of: a first minimum number of antennas to be used for an azimuth angle estimation, or a second minimum number of antennas to be used for an elevation angle estimation. In such an example, the base station may transmit a notification to the network entity indicating that the network node is incapable of using at least the minimum number of antennas for measuring the UL-AoA of the set of UL-SRSs transmitted from the UE. In such an example, the base station may skip monitoring the set of UL-SRSs transmitted from the UE.

Figure 13:
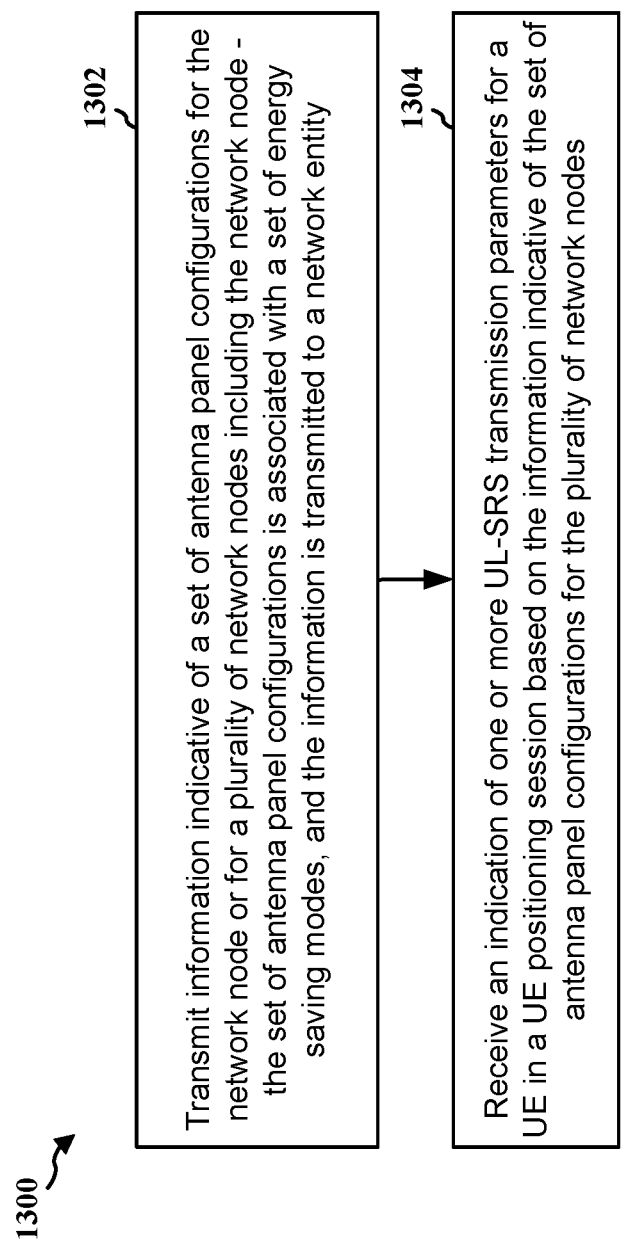
FIG. 13 is a flowchart of a method of wireless communication.

FIG. 13 is a flowchart 1300 of a method of wireless communication. The method may be performed by a base station (e.g., the base station 102, 502; the serving base station 604; the one or more neighboring base stations 608; the network entity 1402). The method may enable the base station to report different network energy/power saving operations associated with its TRPs during a UE positioning session to improve the efficiency and accuracy of the UE positioning.

At 1302, the base station may transmit information indicative of a set of antenna panel configurations for the network node or for a plurality of network nodes including the network node, where the set of antenna panel configurations is associated with a set of energy saving modes, where the information is transmitted to a network entity, such as described in connection with FIGS. 5 to 8. For example, at 610 of FIG. 6, the serving base station 604 and the one or more neighboring base stations 608 may transmit their TRP configuration information to the LMF 606, where the TRP configuration information is associated with a set of energy saving modes, such as shown at 802 of FIG. 8. The transmission of the information indicative of a set of antenna panel configurations may be performed by, e.g., the antenna configuration indication component 199 and/or the communication interface 1418, 1438, and/or 1448 of the network entity 1402 in FIG. 14.

In one example, each antenna panel configuration in the set of antenna panel configurations includes a first number of antennas to be used in an UL azimuth angle measurement and a second number of antennas to be used in an UL elevation angle measurement under one energy saving mode in the set of energy saving modes.

At 1304, the base station may receive an indication of one or more UL-SRS transmission parameters for a UE in a UE positioning session based on the information indicative of the set of antenna panel configurations for the plurality of network nodes, such as described in connection with FIG. 6. For example, at 628, the serving base station 604 and one or more neighboring base stations 608 may receive an indication of one or more UL-SRS transmission parameters for the UE 602 in a UE positioning session from the LMF 606 based on the TRP configuration information which indicates the set of antenna panel configurations for the serving base station 604 and one or more neighboring base stations 608. The reception of the indication of one or more UL-SRS transmission parameters may be performed by, e.g., the antenna configuration indication component 199 and/or the communication interface 1418, 1438, and/or 1448 of the network entity 1402 in FIG. 14.

In one example, the set of antenna panel configurations are different between two energy saving modes in the set of energy saving modes.

In another example, the indication is associated with a configuration of the UE to transmit a set of UL-SRSs to the plurality of network nodes based on the one or more UL-SRS transmission parameters.

In another example, the information further includes a current antenna configuration used by the network node for receiving the set of UL-SRSs from the UE or for measuring UL-AoA of the set of UL-SRSs.

In another example, the network entity is a location server or an LMF, and the network node is a base station, a component of the base station, or a TRP.

In another example, each antenna panel configuration in the set of antenna panel configurations is associated with a timer. In such an example, the timer is a function of a corresponding energy saving mode. In such an example, the base station may receive a request to report an updated antenna panel configuration if the timer associated with an antenna panel configuration expires.

In another example, the base station may configure the one or more UL-SRS transmission parameters for the UE in the UE positioning session based on the information indicative of the set of antenna panel configurations for the plurality of network nodes, where the indication is associated with the configuration of the UE to transmit the set of UL-SRSs to the plurality of network nodes based on the one or more UL-SRS transmission parameters, such as described in connection with FIG. 6. For example, at 618, the serving base station 604 configure SRS transmission parameters for the UE 602 in the UE positioning session based on the information indicative of the set of antenna panel configurations for the serving base station 604 and one or more neighboring base stations 608, where the indication is associated with the configuration of the UE to transmit the set of UL-SRSs to the plurality of network nodes based on the one or more UL-SRS transmission parameters. The configuration of the one or more UL-SRS transmission parameters may be performed by, e.g., the antenna configuration indication component 199 and/or the communication interface 1418, 1438, and/or 1448 of the network entity 1402 in FIG. 14.

In another example, the base station may configure at least one TRP for a set of measurements based on the information indicative of the set of antenna panel configurations for the plurality of network nodes, such as described in connection with FIG. 6. For example, at 628 of FIG. 6, the serving base station 604 may configure at least one TRP for a set of measurements based on the information indicative of the set of antenna panel configurations for the serving base station 604. The configuration of the at least one TRP may be performed by, e.g., the antenna configuration indication component 199 and/or the communication interface 1418, 1438, and/or 1448 of the network entity 1402 in FIG. 14.

In another example, the base station may transmit a second indication that the network node is switching to a different antenna panel configuration, and the base station may receive a measurement update request from the network entity based on the second indication, such as described in connection with FIGS. 6 and 7. For example, at 702 of FIG. 7, the serving base station 604 may transmit a TRP information update message to the LMF 606 indicating that at least one TRP is switching to a different antenna panel configuration. In response, at 628 of FIG. 6, the serving base station 604 may receive a measurement update request from the LMF 606 based on the TRP information update message. The transmission of the second indication and/or the reception of the measurement update request may be performed by, e.g., the antenna configuration indication component 199 and/or the communication interface 1418, 1438, and/or 1448 of the network entity 1402 in FIG. 14. In one example, the second indication is transmitted based on a defined number of network nodes switching to different antenna panel configurations.

In another example, the base station may transmit a second indication to the network entity indicating whether an energy saving mode associated with the network node or associated with an antenna panel configuration of the network node supports an UL-AoA measurement or does not support the UL-AoA measurement, such as described in connection with FIGS. 5 to 8. For example, at 610 of FIG. 6, the serving base station 604 may transmit an indication indicating that a TRP does not support measuring UL-AoA of UL-SRS in certain energy saving modes to the LMF 606. The transmission of the second indication may be performed by, e.g., the antenna configuration indication component 199 and/or the communication interface 1418, 1438, and/or 1448 of the network entity 1402 in FIG. 14.

In another example, the base station may receive a second indication of a minimum number of antennas to be used for measuring UL-AoA of UL-SRS transmitted from the UE in the UE positioning session, where the indication is received from the network entity, and the base station may transmit, to the network entity, UL-AoA measurements for the set of UL-SRSs transmitted from the UE if the network node is capable of measuring the UL-AoA of the set of UL-SRSs transmitted from the UE using at least the minimum number of antennas. In such an example, the minimum number of antennas include at least one of: a first minimum number of antennas to be used for an azimuth angle estimation, or a second minimum number of antennas to be used for an elevation angle estimation. In such an example, the base station may transmit a notification to the network entity indicating that the network node is incapable of using at least the minimum number of antennas for measuring the UL-AoA of the set of UL-SRSs transmitted from the UE. In such an example, the base station may skip monitoring the set of UL-SRSs transmitted from the UE.

Figure 14:
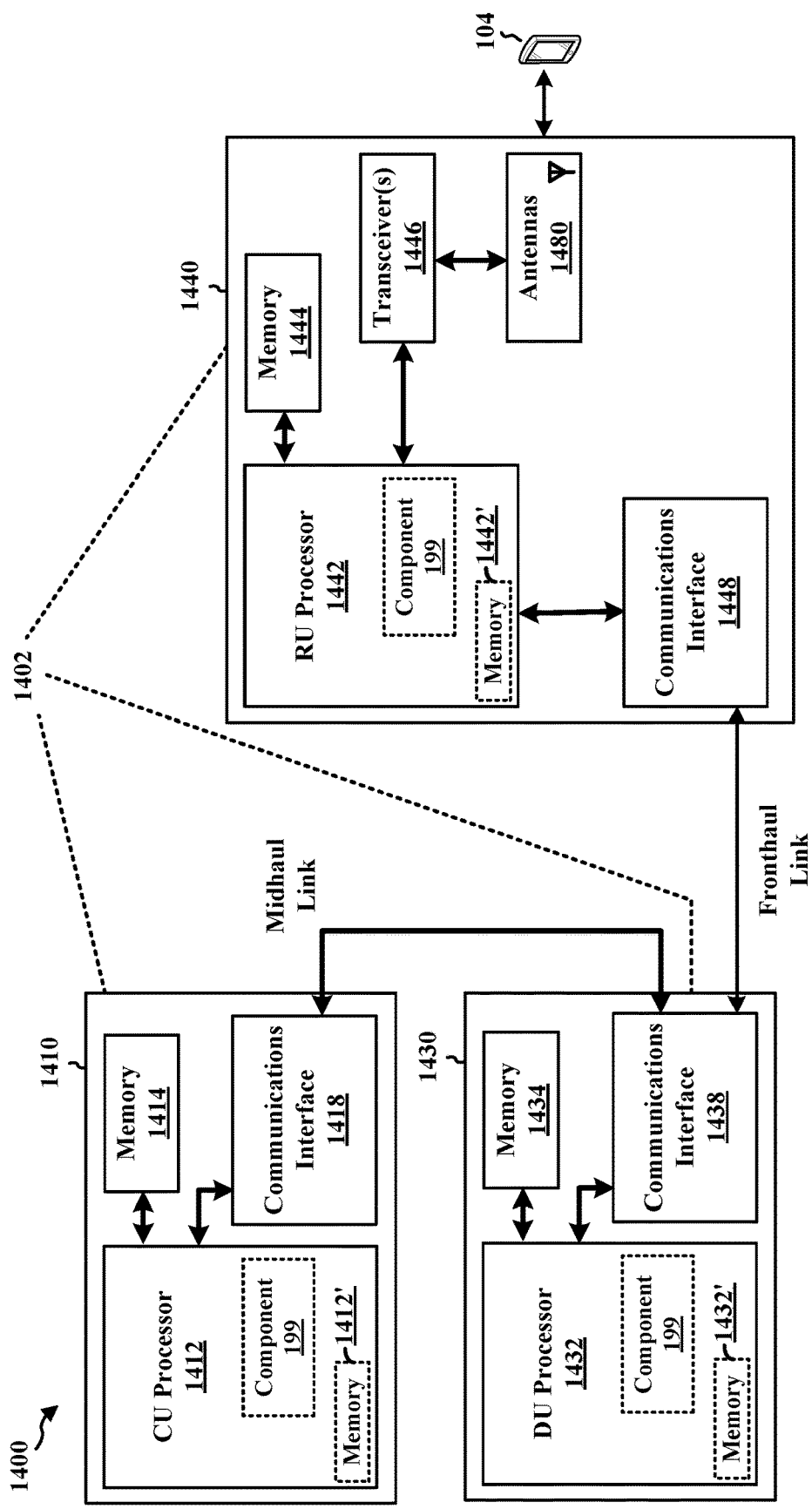
FIG. 14 is a diagram illustrating an example of a hardware implementation for a network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the antenna configuration indication component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the antenna configuration indication component 199 is configured to transmit information indicative of a set of antenna panel configurations for the network node or for a plurality of network nodes including the network node, where the set of antenna panel configurations is associated with a set of energy saving modes, where the information is transmitted to a network entity. The antenna configuration indication component 199 may also be configured to receive an indication of one or more UL-SRS transmission parameters for a UE in a UE positioning session based on the information indicative of the set of antenna panel configurations for the plurality of network nodes. The antenna configuration indication component 199 may be within one or more processors of one or more of the CU 1410, DU 1430, and the RU 1440. The antenna configuration indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting information indicative of a set of antenna panel configurations for the network node or for a plurality of network nodes including the network node, where the information is transmitted to a network entity. The network entity 1402 may further include means for receiving an indication of one or more UL-SRS transmission parameters for a UE in a UE positioning session based on the information indicative of the set of antenna panel configurations for the plurality of network nodes.

In one configuration, the set of antenna panel configurations are different between two energy saving modes in the set of energy saving modes.

In another configuration, the set of antenna panel configurations is associated with a set of energy saving modes, where each antenna panel configuration in the set of antenna panel configurations includes a first number of antennas to be used in an UL azimuth angle measurement and a second number of antennas to be used in an UL elevation angle measurement under one energy saving mode in the set of energy saving modes.

In another configuration, the indication is associated with a configuration of the UE to transmit a set of UL-SRSs to the plurality of network nodes based on the one or more UL-SRS transmission parameters.

In another configuration, the information further includes a current antenna configuration used by the network node for receiving the set of UL-SRSs from the UE or for measuring UL-AoA of the set of UL-SRSs.

In another configuration, the network entity is a location server or an LMF, and the network node is a base station, a component of the base station, or a TRP.

In another configuration, each antenna panel configuration in the set of antenna panel configurations is associated with a timer. In such a configuration, the timer is a function of a corresponding energy saving mode. In such a configuration, the network entity 1402 may further include means for receiving a request to report an updated antenna panel configuration if the timer associated with an antenna panel configuration expires.

In another configuration, the network entity 1402 may further include means for configuring the one or more UL-SRS transmission parameters for the UE in the UE positioning session based on the information indicative of the set of antenna panel configurations for the plurality of network nodes, where the indication is associated with the configuration of the UE to transmit the set of UL-SRSs to the plurality of network nodes based on the one or more UL-SRS transmission parameters.

In another configuration, the network entity 1402 may further include means for configuring at least one TRP for a set of measurements based on the information indicative of the set of antenna panel configurations for the plurality of network nodes.

In another configuration, the network entity 1402 may further include means for transmitting a second indication that the network node is switching to a different antenna panel configuration, and means for receiving a measurement update request from the network entity based on the second indication. In such a configuration, the second indication is transmitted based on a defined number of network nodes switching to different antenna panel configurations.

In another configuration, the network entity 1402 may further include means for transmitting a second indication to the network entity indicating whether an energy saving mode associated with the network node or associated with an antenna panel configuration of the network node supports an UL-AoA measurement or does not support the UL-AoA measurement.

In another configuration, the network entity 1402 may further include means for receiving a second indication of a minimum number of antennas to be used for measuring UL-AoA of UL-SRS transmitted from the UE in the UE positioning session, where the indication is received from the network entity, and means for transmitting, to the network entity, UL-AoA measurements for the set of UL-SRSs transmitted from the UE if the network node is capable of measuring the UL-AoA of the set of UL-SRSs transmitted from the UE using at least the minimum number of antennas. In such a configuration, the minimum number of antennas include at least one of: a first minimum number of antennas to be used for an azimuth angle estimation, or a second minimum number of antennas to be used for an elevation angle estimation. In such a configuration, the network entity 1402 may further include means for transmitting a notification to the network entity indicating that the network node is incapable of using at least the minimum number of antennas for measuring the UL-AoA of the set of UL-SRSs transmitted from the UE. In such a configuration, the network entity 1402 may further include means for skipping monitoring the set of UL-SRSs transmitted from the UE.

The means may be the antenna configuration indication component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: receiving information indicative of a set of antenna panel configurations for a plurality of network nodes, where the set of antenna panel configurations is associated with a set of energy saving modes; and transmitting an indication of one or more UL-SRS transmission parameters for a UE in a UE positioning session based on the information indicative of the set of antenna panel configurations for the plurality of network nodes.

Aspect 2 is the method of aspect 1, where each antenna panel configuration in the set of antenna panel configurations includes a first number of antennas to be used in an UL azimuth angle measurement and a second number of antennas to be used in an UL elevation angle measurement under one energy saving mode in the set of energy saving modes.

Aspect 3 is the method of aspect 1 or 2, where the indication is associated with a configuration of the UE to transmit a set of UL-SRSs to the plurality of network nodes based on the one or more UL-SRS transmission parameters.

Aspect 4 is the method of any of aspects 1 to 3, where the set of antenna panel configurations are different between two network nodes in the plurality of network nodes or between two energy saving modes in the set of energy saving modes.

Aspect 5 is the method of any of aspects 1 to 4, where the set of antenna panel configurations for each of the plurality of network nodes is received from each corresponding network node.

Aspect 6 is the method of any of aspects 1 to 5, where the plurality of network nodes includes a serving network node of the UE and one or more non-serving network nodes, the method further including: receiving the set of antenna panel configurations for the one or more non-serving network nodes via the serving network node.

Aspect 7 is the method of any of aspects 1 to 6, further including: transmitting the one or more UL-SRS transmission parameters to the UE via a serving network node of the UE.

Aspect 8 is the method any of aspects 1 to 7, where the information further includes a current antenna configuration used by each of the plurality of network nodes for receiving the set of UL-SRSs from the UE or for measuring UL-AoA of the set of UL-SRS s.

Aspect 9 is the method of any of aspects 1 to 8, further including: receiving a second indication that at least one network node in the plurality of network nodes is switching to a different antenna panel configuration; and transmitting a measurement update request to one or more network nodes in the plurality of network nodes based on the second indication.

Aspect 10 is the method of aspect 9, where the second indication is received based on a defined number of network nodes or a defined fraction of network nodes in the plurality of network nodes switching to the different antenna panel configuration.

Aspect 11 is the method of any of aspects 1 to 8, where the network entity is a location server or an LMF, and the plurality of network nodes includes at least one base station, a component of the at least one base station, at least one TRP, or a combination thereof.

Aspect 12 is the method of any of aspects 1 to 9, where each antenna panel configuration in the set of antenna panel configurations is associated with a timer.

Aspect 13 is the method of aspect 12, where the timer is a function of a corresponding energy saving mode.

Aspect 14 is the method of aspect 12, further including: transmitting a request to report an updated antenna panel configuration to a network node in the plurality of network nodes if the timer associated with an antenna panel configuration of the network node expires.

Aspect 15 is the method of any of aspects 1 to 14, further including: transmitting a second indication of a minimum number of antennas to be used for measuring UL-AoA of a set of UL-SRSs transmitted from the UE in the UE positioning session, where the indication is transmitted to the plurality of network nodes; and receiving, from a first set of network nodes in the plurality of network nodes, UL-AoA measurements for the set of UL-SRSs transmitted from the UE, where the first set of network nodes is capable of using at least the minimum number of antennas for measuring the UL-AoA of the set of UL-SRSs transmitted from the UE.

Aspect 16 is the method of aspect 15, where the minimum number of antennas include at least one of: a first minimum number of antennas to be used for an azimuth angle estimation, or a second minimum number of antennas to be used for an elevation angle estimation.

Aspect 17 is the method of aspect 15, further including: receiving a notification from a second set of network nodes in the plurality of network nodes indicating that the second set of network nodes is incapable of using at least the minimum number of antennas for measuring the UL-AoA of the set of UL-SRSs transmitted from the UE.

Aspect 18 is the method of aspect 17, where the second set of network nodes is configured to skip monitoring the set of UL-SRSs transmitted from the UE.

Aspect 19 is the method of aspect 15, where the second indication of the minimum number of antennas to be used for measuring the UL-AoA is transmitted to the plurality of network nodes via a measurement request information message.

Aspect 20 is the method of any of aspects 1 to 19, further including: receiving a second indication indicating that at least one of the plurality of network nodes does not support measuring UL-AoA of UL-SRS in at least one of the set of energy saving modes; and excluding the at least one of the plurality of network nodes from the UE positioning session if the at least one of the plurality of network nodes is under an energy saving mode that does not support measuring UL-AoA of UL-SRS.

Aspect 21 is an apparatus for wireless communication at a network entity, including: a memory; and at least one processor coupled to the memory and, based at least in part on information stored in the memory, the at least one processor is configured to implement any of aspects 1 to 20.

Aspect 22 is the apparatus of aspect 21, further including at least one of a transceiver or an antenna coupled to the at least one processor.

Aspect 23 is an apparatus for wireless communication including means for implementing any of aspects 1 to 20.

Aspect 24 is a computer-readable medium (e.g., a non-transitory computer-readable medium) storing computer executable code, where the code when executed by a processor causes the processor to implement any of aspects 1 to 20.

Aspect 25 is a method of wireless communication at a network node, including: transmitting information indicative of a set of antenna panel configurations for the network node or for a plurality of network nodes including the network node, where the set of antenna panel configurations is associated with a set of energy saving modes, where the information is transmitted to a network entity; and receiving an indication of one or more UL-SRS transmission parameters for a UE in a UE positioning session based on the information indicative of the set of antenna panel configurations for the plurality of network nodes.

Aspect 26 is the method of aspect 25, where each antenna panel configuration in the set of antenna panel configurations includes a first number of antennas to be used in an UL azimuth angle measurement and a second number of antennas to be used in an UL elevation angle measurement under one energy saving mode in the set of energy saving modes.

Aspect 27 is the method of aspect 25 or aspect 26, where the indication is associated with a configuration of the UE to transmit a set of UL-SRSs to the plurality of network nodes based on the one or more UL-SRS transmission parameters.

Aspect 28 is the method of any of aspects 25 to 27, further including: configuring the one or more UL-SRS transmission parameters for the UE in the UE positioning session based on the information indicative of the set of antenna panel configurations for the plurality of network nodes, where the indication is associated with the configuration of the UE to transmit the set of UL-SRSs to the plurality of network nodes based on the one or more UL-SRS transmission parameters.

Aspect 29 is the method of aspect 25 or aspect 28, further including: configuring at least one TRP for a set of measurements based on the information indicative of the set of antenna panel configurations for the plurality of network nodes.

Aspect 30 is the method of any of aspects 25 to 29, where the set of antenna panel configurations are different between two energy saving modes in the set of energy saving modes.

Aspect 31 is the method of any of aspects 25 to 30, where the information further includes a current antenna configuration used by the network node for receiving the set of UL-SRSs from the UE or for measuring UL-AoA of the set of UL-SRSs.

Aspect 32 is the method of any of aspects 25 to 31, further including: transmitting a second indication that the network node is switching to a different antenna panel configuration; and receiving a measurement update request from the network entity based on the second indication.

Aspect 33 is the method of aspect 32, where the second indication is transmitted based on a defined number of network nodes switching to different antenna panel configurations.

Aspect 34 is the method of any of aspects 25 to 33, where the network entity is a location server or an LMF, and the network node is a base station, a component of the base station, or a TRP.

Aspect 35 is the method of any of aspects 25 to 34, where each antenna panel configuration in the set of antenna panel configurations is associated with a timer.

Aspect 36 is the method of aspect 35, where the timer is a function of a corresponding energy saving mode.

Aspect 37 is the method of aspect 35, further including: receiving a request to report an updated antenna panel configuration if the timer associated with an antenna panel configuration expires.

Aspect 38 is the method of any of aspects 25 to 37, further including: transmitting a second indication to the network entity indicating whether an energy saving mode associated with the network node or associated with an antenna panel configuration of the network node supports an UL-AoA measurement or does not support the UL-AoA measurement.

Aspect 39 is the method of any of aspects 25 to 38, further including: receiving a second indication of a minimum number of antennas to be used for measuring UL-AoA of UL-SRS transmitted from the UE in the UE positioning session, where the indication is received from the network entity; and transmitting, to the network entity, UL-AoA measurements for the set of UL-SRSs transmitted from the UE if the network node is capable of measuring the UL-AoA of the set of UL-SRSs transmitted from the UE using at least the minimum number of antennas.

Aspect 40 is the method of aspect 39, where the minimum number of antennas include at least one of: a first minimum number of antennas to be used for an azimuth angle estimation, or a second minimum number of antennas to be used for an elevation angle estimation.

Aspect 41 is the method of aspect 39, further including: transmitting a notification to the network entity indicating that the network node is incapable of using at least the minimum number of antennas for measuring the UL-AoA of the set of UL-SRS s transmitted from the UE.

Aspect 42 is the method of aspect 41, further including: skipping monitoring the set of UL-SRSs transmitted from the UE.

Aspect 43 is an apparatus for wireless communication at a network node, including: a memory; and at least one processor coupled to the memory and, based at least in part on information stored in the memory, the at least one processor is configured to implement any of aspects 25 to 42.

Aspect 44 is the apparatus of aspect 43, further including at least one of a transceiver or an antenna coupled to the at least one processor.

Aspect 45 is an apparatus for wireless communication including means for implementing any of aspects 25 to 42.

Aspect 46 is a computer-readable medium (e.g., a non-transitory computer-readable medium) storing computer executable code, where the code when executed by a processor causes the processor to implement any of aspects 25 to 42.

What is claimed is:

1. An apparatus for wireless communication at a network entity, comprising:
at least one memory; and
at least one processor coupled to the at least one memory and, based at least in part on second information stored in the at least one memory, the at least one processor is configured to:
receive information indicative of a set of antenna panel configurations for a plurality of network nodes, wherein each antenna panel configuration in the set of antenna panel configurations is associated with an energy saving mode supported by at least one network node in the plurality of network nodes;
determine, based on the information, one or more uplink (UL)-sounding reference signal (SRS) (UL-SRS) transmission parameters for a user equipment (UE) during a positioning session of the UE; and
transmit an indication of the one or more UL-SRS transmission parameters to the UE.

2. The apparatus of claim 1, wherein each antenna panel configuration in the set of antenna panel configurations includes a first number of antennas to be used in an UL azimuth angle measurement and a second number of antennas to be used in an UL elevation angle measurement for an associated energy saving mode.

3. The apparatus of claim 1, wherein the indication is associated with a configuration of the UE to transmit a set of UL-SRSs to the plurality of network nodes based on the one or more UL-SRS transmission parameters.

4. The apparatus of claim 1, wherein to receive the information indicative of the set of antenna panel configurations for the plurality of network nodes, the at least one processor is configured to:

receive, from the plurality of network nodes, the information indicative of the set of antenna panel configurations for the plurality of network nodes.

5. The apparatus of claim 1, wherein the plurality of network nodes includes a serving network node of the UE and one or more non-serving network nodes, and wherein to receive the information indicative of the set of antenna panel configurations for the plurality of network nodes, the at least one processor is further configured to:
receive, from the serving network node of the UE, the information indicative of the set of antenna panel configurations for the plurality of network nodes.

6. The apparatus of claim 1, wherein to transmit the indication of the one or more UL-SRS transmission parameters to the UE, the at least one processor is configured to:
transmit the indication of the one or more UL-SRS transmission parameters to the UE via a serving network node of the UE.

7. The apparatus of claim 1, wherein the information further includes a current antenna configuration used by each of the plurality of network nodes for a reception of a set of UL-SRSs from the UE or for a measurement of an UL-angle of arrival (UL-AoA) of the set of UL-SRSs.

8. The apparatus of claim 1, wherein the at least one processor is further configured to:
receive a second indication that a network node in the plurality of network nodes is configured to switch to a different antenna panel configuration; and
transmit a measurement update request to one or more network nodes in the plurality of network nodes based on the second indication.

9. The apparatus of claim 8, wherein to receive the second indication, the at least one processor is configured to:
receive the second indication based on a defined number of network nodes or a defined fraction of network nodes in the plurality of network nodes being configured to switch to the different antenna panel configuration.

10. The apparatus of claim 1, wherein each antenna panel configuration in the set of antenna panel configurations is associated with a timer, wherein the at least one processor is further configured to:
transmit a request to report an updated antenna panel configuration to a network node in the plurality of network nodes if the timer associated with an antenna panel configuration of the network node is configured to expire, wherein the timer is a function of a corresponding energy saving mode.

11. The apparatus of claim 1, wherein the at least one processor is further configured to:
transmit, to the plurality of network nodes, a second indication to use at least a specified number of antennas for a measurement of an UL-angle of arrival (UL-AoA) of a set of UL-SRSs from the UE in the positioning session of the UE; and
receive, from a first set of network nodes in the plurality of network nodes, a set of UL-AoA measurements obtained by the first set of network nodes based on using at least the specified number of antennas.

12. The apparatus of claim 11, wherein the specified number of antennas include at least one of:
a first specified number of antennas to be used for an azimuth angle estimation, or
a second specified number of antennas to be used for an elevation angle estimation.

13. The apparatus of claim 11, wherein the at least one processor is further configured to:
receive, from a second set of network nodes in the plurality of network nodes, a notification indicating that the second set of network nodes is incapable of using at least the specified number of antennas for the measurement of the UL-AoA of the set of UL-SRSs from the UE.

14. The apparatus of claim 11, wherein to transmit the second indication, the at least one processor is configured to:
transmit the second indication via a measurement request information message.

15. The apparatus of claim 1, wherein the at least one processor is further configured to:
receive a second indication indicating that a network node in the plurality of network nodes does not support a measurement of an UL-angle of arrival (UL-AoA) of a set of UL-SRSs in an associated energy saving mode; and
exclude the network node from the positioning session of the UE if the network node is under the associated energy saving mode.

16. A method of wireless communication at a network entity, comprising:
receiving information indicative of a set of antenna panel configurations for a plurality of network nodes, wherein each antenna panel configuration in the set of antenna panel configurations is associated with an energy saving mode supported by at least one network node in the plurality of network nodes;
determining, based on the information, one or more uplink (UL)-sounding reference signal (SRS) (UL-SRS) transmission parameters for a user equipment (UE) during a positioning session of the UE; and
transmitting an indication of the one or more UL-SRS transmission parameters to the UE.

17. An apparatus for wireless communication at a network node, comprising:
at least one memory; and
at least one processor coupled to the at least one memory and, based at least in part on second information stored in the at least one memory, the at least one processor is configured to:
transmit, to a network entity, information indicative of a set of antenna panel configurations for the network node or for a plurality of network nodes including the network node, wherein each antenna panel configuration in the set of antenna panel configurations is associated with an energy saving mode supported by at least one network node in the plurality of network nodes; and
receive, from the network entity based on the information, an indication of one or more uplink (UL)-sounding reference signal (SRS) (UL-SRS) transmission parameters for a user equipment (UE) in a positioning session of the UE.

18. The apparatus of claim 17, wherein each antenna panel configuration in the set of antenna panel configurations includes a first number of antennas to be used in an uplink (UL) azimuth angle measurement and a second number of antennas to be used in an UL elevation angle measurement for an associated energy saving mode.

19. The apparatus of claim 17, wherein the indication is associated with a configuration of the UE to transmit a set of UL-SRSs to the plurality of network nodes based on the one or more UL-SRS transmission parameters.

20. The apparatus of claim 17, wherein the at least one processor is further configured to:
configure the one or more UL-SRS transmission parameters for the UE in the positioning session of the UE based on the information indicative of the set of antenna panel configurations for the plurality of network nodes, wherein the indication is associated with the configuration of the UE to transmit a set of UL-SRSs to the plurality of network nodes based on the one or more UL-SRS transmission parameters.

21. The apparatus of claim 17, wherein the at least one processor is further configured to:
configure at least one transmission reception point (TRP) for a set of measurements based on the information indicative of the set of antenna panel configurations for the plurality of network nodes.

22. The apparatus of claim 17, wherein the information further includes a current antenna configuration used by the network node for receiving a set of UL-SRSs from the UE or for measuring UL-angle of arrival (UL-AoA) of the set of UL-SRSs.

23. The apparatus of claim 17, wherein the at least one processor is further configured to:
transmit a second indication that the network node is configured to switch to a different antenna panel configuration; and
receive a measurement update request from the network entity based on the second indication.

24. The apparatus of claim 23, wherein to transmit the second indication, the at least one processor is configured to transmit the second indication based on a defined number of network nodes being configured to switch to different antenna panel configurations.

25. The apparatus of claim 17, wherein each antenna panel configuration in the set of antenna panel configurations is associated with a timer, the at least one processor is further configured to:
receive a request to report an updated antenna panel configuration if the timer associated with an antenna panel configuration is configured to expire, wherein the timer is a function of an associated energy saving mode.

26. The apparatus of claim 17, wherein the at least one processor is further configured to:
transmit a second indication to the network entity indicating whether an energy saving mode associated with the network node or associated with an antenna panel configuration of the network node is configured to support an UL-angle of arrival (UL-AoA) measurement or is not configured to support the UL-AoA measurement.

27. The apparatus of claim 17, wherein the at least one processor is further configured to:
receive, from the network entity, a second indication of using at least a specified number of antennas for a measurement of an UL-angle of arrival (UL-AoA) of a set of UL-SRSs from the UE in the positioning session of the UE; and
transmit, to the network entity, UL-AoA measurements for the set of UL-SRSs from the UE if the UL-AoA measurements is obtained using at least the specified number of antennas.

28. The apparatus of claim 27, wherein the specified number of antennas include at least one of:
a first specified number of antennas to be used for an azimuth angle estimation, or
a second specified number of antennas to be used for an elevation angle estimation.

29. The apparatus of claim 27, wherein the at least one processor is further configured to:
transmit a notification to the network entity indicating that the network node is incapable of using at least the specified number of antennas for the measurement of the UL-AoA of the set of UL-SRSs from the UE; and
skip monitoring the set of UL-SRSs from the UE.

30. A method of wireless communication at a network node, comprising:
transmitting, to a network entity, information indicative of a set of antenna panel configurations for the network node or for a plurality of network nodes including the network node, wherein each antenna panel configuration in the set of antenna panel configurations is associated with an energy saving mode supported by at least one network node in the plurality of network nodes; and
receiving, from the network entity based on the information, an indication of one or more UL-sounding reference signal (UL-SRS) transmission parameters for a user equipment (UE) in a positioning session of the UE.

* * * * *